(12) United States Patent
Fukuda

(10) Patent No.: US 9,954,277 B2
(45) Date of Patent: Apr. 24, 2018

(54) ANTENNA DEVICE AND ANTENNA DEVICE CONTROL METHOD

(71) Applicant: NEC Corporation, Tokyo (JP)

(72) Inventor: Junichi Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 214 days.

(21) Appl. No.: 14/775,508

(22) PCT Filed: Mar. 13, 2014

(86) PCT No.: PCT/JP2014/001422
§ 371 (c)(1),
(2) Date: Sep. 11, 2015

(87) PCT Pub. No.: WO2014/141708
PCT Pub. Date: Sep. 18, 2014

(65) Prior Publication Data
US 2016/0049726 A1    Feb. 18, 2016

(30) Foreign Application Priority Data

Mar. 14, 2013    (JP) ................................. 2013-052071

(51) Int. Cl.
*H01Q 3/00* (2006.01)
*H01Q 3/08* (2006.01)
(Continued)

(52) U.S. Cl.
CPC .................. *H01Q 3/08* (2013.01); *H01Q 1/18* (2013.01); *H01Q 1/22* (2013.01); *H04B 17/12* (2015.01); *H04B 17/21* (2015.01)

(58) Field of Classification Search
CPC .. H01Q 3/08; H01Q 1/18; H01Q 1/22; H01Q 3/00; H04B 17/12; H04B 17/21
(Continued)

(56) References Cited

U.S. PATENT DOCUMENTS

| 5,594,460 A | 1/1997 | Eguchi |
| 2003/0016172 A1 | 1/2003 | Natsume et al. |

(Continued)

FOREIGN PATENT DOCUMENTS

| CN | 101505002 A | 8/2009 |
| CN | 101938037 A | 1/2011 |

(Continued)

OTHER PUBLICATIONS

Chinese Office Action dated Feb. 20, 2017, by the Chinese Patent Office in counterpart Chinese Patent Application No. 201480015046.9.

(Continued)

*Primary Examiner* — Harry K Liu
(74) *Attorney, Agent, or Firm* — Finnegan, Henderson, Farabow, Garrett & Dunner, L.L.P.

(57) ABSTRACT

An antenna unit part is coupled to a housing unit in such a way that the antenna unit part can be relatively oscillated. Acceleration sensors that detect accelerations that occur in an azimuth angle direction and an elevation angle direction are provided in the housing unit. Linear actuators are provided between the housing unit and an antenna unit part so that the linear actuators are able to adjust a relative angle of the antenna unit part with respect to the housing unit. A variation amount calculation unit calculates a variation amount in the elevation angle direction and the azimuth angle direction based on the accelerations detected by the acceleration sensors. A correction amount calculation unit calculates a correction amount to cancel the variation amount calculated by the variation amount calculation unit. The linear actuators are driven based on the correction amount.

9 Claims, 24 Drawing Sheets

(51) Int. Cl.
*H01Q 1/18* (2006.01)
*H01Q 1/22* (2006.01)
*H04B 17/12* (2015.01)
*H04B 17/21* (2015.01)

(58) Field of Classification Search
USPC .......................................................... 342/359
See application file for complete search history.

(56) References Cited

U.S. PATENT DOCUMENTS

| | | |
|---|---|---|
| 2007/0001920 A1 | 1/2007 | Webb et al. |
| 2010/0246886 A1 | 9/2010 | Nakamura et al. |
| 2010/0280340 A1* | 11/2010 | Homan ............... A61B 1/00016 600/302 |
| 2011/0217976 A1* | 9/2011 | Kaplan ................... H01Q 3/04 455/427 |
| 2011/0279310 A1* | 11/2011 | Shibohta ................. G01S 19/36 342/357.25 |

FOREIGN PATENT DOCUMENTS

| | | | |
|---|---|---|---|
| CN | 102722179 A | 10/2012 | |
| EP | 1369954 A2 * | 12/2003 | ............ H01Q 1/241 |
| JP | 6-102334 | 4/1994 | |
| JP | 8-211140 | 8/1996 | |
| JP | 10-107530 | 4/1998 | |
| JP | 11-97919 | 4/1999 | |
| JP | 11-173798 | 7/1999 | |
| JP | 2002-139561 | 5/2002 | |
| JP | 2002-158525 | 5/2002 | |
| JP | 2003-37424 | 2/2003 | |
| JP | 2010-231371 | 10/2010 | |

OTHER PUBLICATIONS

International Search Report dated Jun. 17, 2014 in corresponding PCT International Application.
Extended European Search Report dated Sep. 29, 2016, by the European Patent Office in counterpart European Patent Application No. 14764220.1.

* cited by examiner

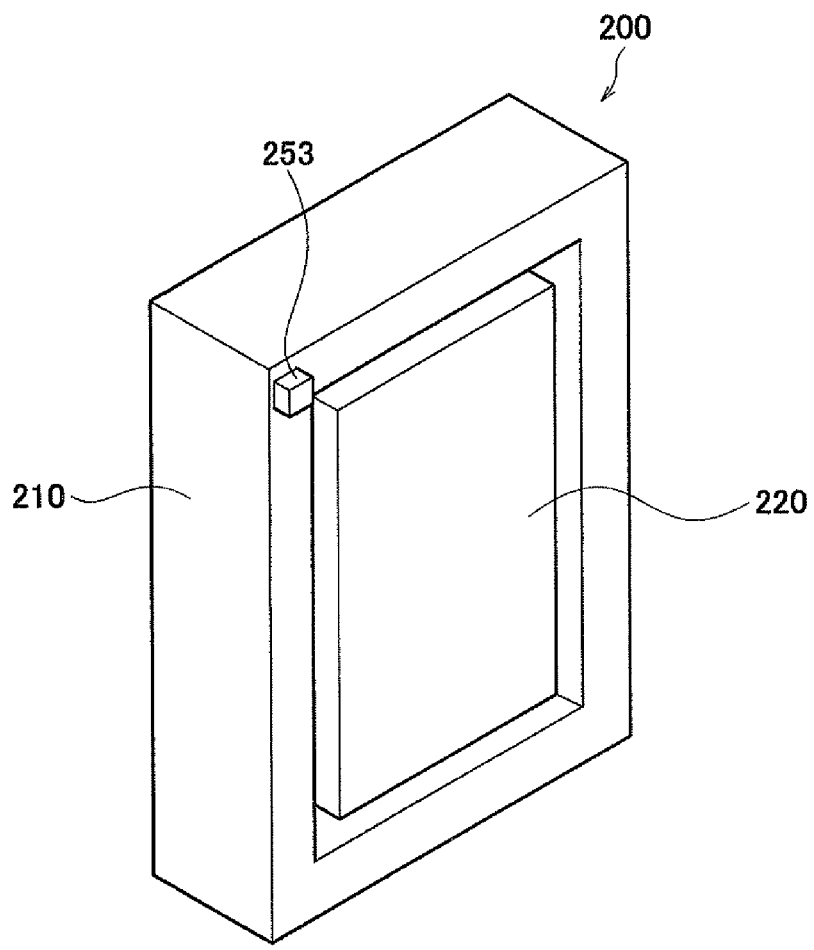
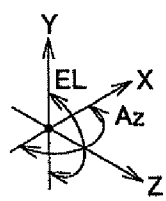
Fig. 13

ANTENNA DEVICE AND ANTENNA DEVICE CONTROL METHOD

CROSS-REFERENCE TO RELATED PATENT APPLICATIONS

This application is a National Stage Entry of International Application No. PCT/JP2014/001422, filed Mar. 13, 2014, which claims priority from Japanese Patent Application No. 2013-052071, filed Mar. 14, 2013. The entire contents of the above-referenced applications are expressly incorporated herein by reference.

TECHNICAL FIELD

The present invention relates to an antenna device and an antenna device control method.

BACKGROUND ART

When a directional antenna is installed, it is important that the antenna faces toward an appropriate direction in which the reception level becomes the maximum. When an operator installs the antenna, the operator changes the direction in which the antenna faces so that it faces various directions to find the direction in which the reception level becomes the maximum so as to be able to install the antenna so that the antenna faces toward this direction. As a matter of course, even after the antenna is installed, the antenna needs to constantly face toward the direction in which radio waves are coming.

For example, Patent literature 1 (Japanese Unexamined Patent Application Publication No. 6-1023345) discloses a receiving device that automatically tracks satellite broadcast waves. This receiving device is installed, for example, in a vehicle such as an automobile. The receiving device includes an antenna, a swing mechanism which pivotally drives the antenna, and a gyro sensor that detects a variation amount of a traveling direction of the vehicle. When the gyro sensor detects that there has been a change in the traveling direction of the vehicle, the swing mechanism swings the antenna in a direction opposite to the direction in which there has been a change in the traveling direction of the vehicle. According to this configuration, even when there is a change in the traveling direction of the vehicle, the antenna constantly faces toward the direction of the satellite.

CITATION LIST

Patent Literature

[Patent Literature 1] Japanese Unexamined Patent Application Publication No. 6-102334

SUMMARY OF INVENTION

Technical Problem

In recent years, the wave level of radio waves used for radio communication has become a millimeter, and the beam width of the radio waves has become quite narrow. Even when an antenna is displaced by a quite minute angle of, for example, less than 1.0° (e.g., 0.4° or 0.2°), the reception level of the antenna may be extremely deteriorate, and in the worst case, a disconnection may be caused. When the tolerance of the displacement is narrowed as much as stated above, even a small disturbance may cause an extreme degradation in the reception level even when the antenna is installed so as to face toward the optimal direction. When a slightly strong wind or an earthquake occurs, for example, a vibration is imparted to the antenna. Even when the angle of the shake due to the vibration is a minute angle such as 0.4° or 0.2°, this may cause a disconnection. At the time of a disaster, in particular, radio communication is expected to play an important role. Thus, an antenna device having robustness and capable of keeping a constantly high reception level is required.

The receiving device disclosed in Patent literature 1 receives satellite broadcast waves. However, the main beam width of the satellite broadcast waves is large and the tolerance for the displacement in the direction of the antenna is large. Since the satellite broadcast waves are considered to come substantially from infinity, it is sufficient to only take care that the antenna (rotation angle) is constantly facing toward the direction in which the radio waves are coming regardless of the amount of movement of the vehicle. However, it is clear that the technique disclosed in Patent literature 1 is not sufficient to deal with recent trends such as a sudden increase in communication capacity, wider bandwidth, higher frequency and the like.

One exemplary object of the present invention is to provide an antenna device and an antenna device control method capable of adjusting the posture of an antenna with high accuracy even in a circumstance where a vibration is imparted to the antenna device and always keeping a high reception level.

Solution to Problem

An antenna device according to the present invention includes: a housing unit that is fixedly installed; an antenna unit part that is housed in the housing unit and receives radio waves coming from an opposing antenna; movable coupling means for coupling the antenna unit part to the housing unit in such a way that the antenna unit part can be relatively oscillated in an azimuth angle direction and an elevation angle direction; acceleration detection means arranged in one of the housing unit and the antenna unit part, the acceleration detection means detecting an acceleration that occurs in the azimuth angle direction and the elevation angle direction; angle adjustment means for adjusting a relative angle of the antenna unit part with respect to the housing unit; a variation amount calculation unit that calculates a variation amount in the elevation angle direction and the azimuth angle direction based on the acceleration that is detected by the acceleration detection means; a correction amount calculation unit that calculates a correction amount to cancel the variation amount calculated by the variation amount calculation unit; and a drive circuit that drives the angle adjustment means based on the correction amount.

Advantageous Effects of Invention

According to the present invention, it is possible to keep a high reception level in an antenna unit part even in a circumstance where a vibration is imparted to an antenna device.

BRIEF DESCRIPTION OF DRAWINGS

FIG. 13 is a diagram showing the modified example;

DESCRIPTION OF EMBODIMENTS

With reference to the drawings in which elements are denoted by reference symbols, exemplary embodiments of the present invention will be described.

First Exemplary Embodiment

A first exemplary embodiment according to the present invention will be described.

Figure 1:
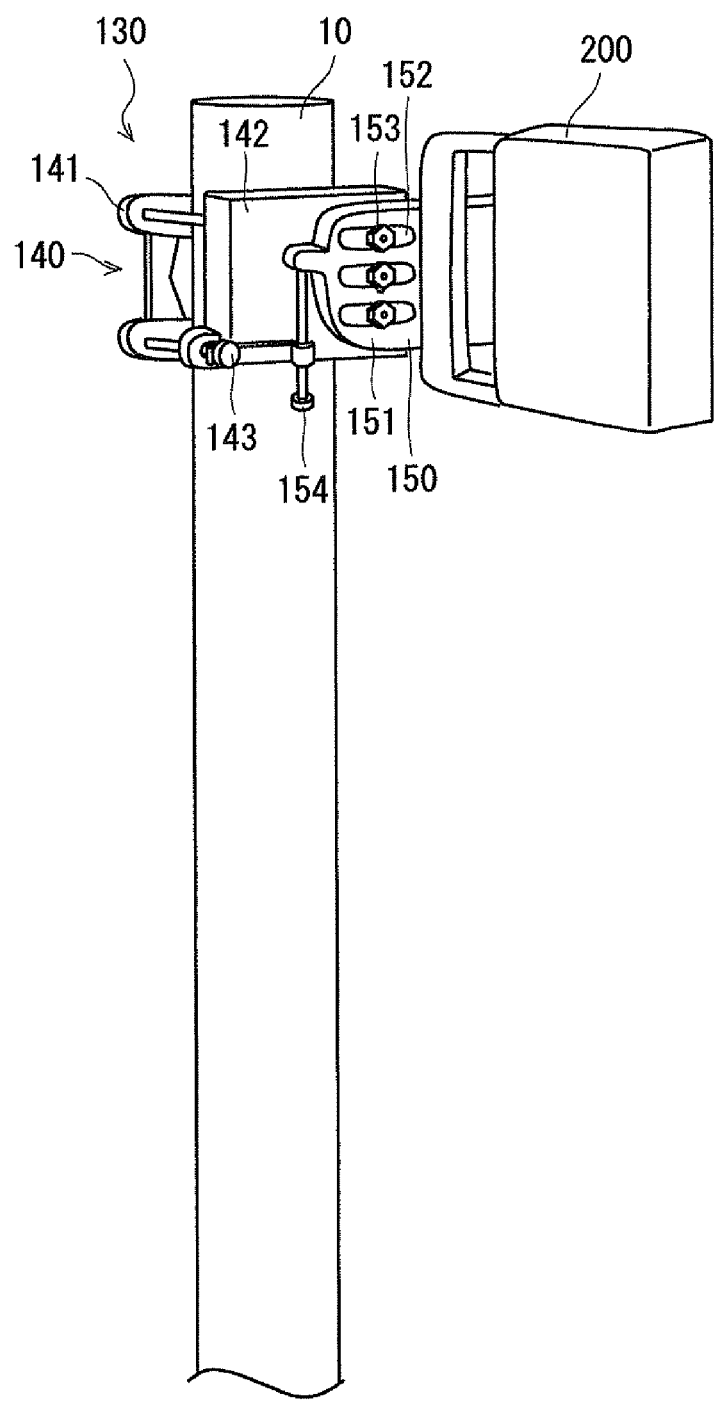
FIG. 1 is a diagram showing a state in which an antenna device is installed in a pole.

FIG. 1 shows an antenna device 200 installed in a pole 10 seen from a back side. The antenna device 200 is attached and fixed to the pole 10 by an attachment means 130. While the structure of the attachment means 130 is already known, it will be briefly described.

The attachment means 130 installs the antenna device 200 in the pole 10 and fixes it thereto.

An example in which the attachment means 130 fixes the antenna device 200 to the pole 10 will be described here. The attachment means 130 includes a clamping means 140 and an elevation angle adjustment metal fitting 150. The clamping means 140 includes a press metal fitting 141 and a receiving metal fitting 142 that hold the pole 10 from opposite directions. The press metal fitting 141 and the receiving metal fitting 142 are coupled to each other by a fastening bolt 143.

When the press metal fitting 141 and the receiving metal fitting 142 hold the pole 10, the direction (orientation) of the antenna device 200 is adjusted by adjusting the direction (orientation) of the receiving metal fitting 142. Further, by rotating the fastening bolt 143 to adjust the gap between the press metal fitting 141 and the receiving metal fitting 142, the direction (orientation) of the antenna device 200 can be adjusted around the pole 10.

The elevation angle adjustment metal fitting 150 couples the antenna device 200 to the clamping means 140 while adjusting the elevation angle of the antenna device 200. The elevation angle adjustment metal fitting 150 is fixed to the receiving metal fitting 142 in a base end side (151) and is connected and fixed to the antenna device 200 in a tip end side.

(In FIG. 1, the tip end side of the elevation angle adjustment metal fitting 150 is hidden behind the antenna device 200.) Oblong holes 152 are provided in the base end side (151) of the elevation angle adjustment metal fitting 150 and the elevation angle adjustment metal fitting 150 is screwed into the receiving metal fitting 142 by attachment screws 153 passing through the oblong holes 152.

An adjustment screw 154 that is hung down substantially in the vertical direction is provided in the base end 151 of the elevation angle adjustment metal fitting 150 and this adjustment screw 154 is also screwed into the receiving metal fitting 142. By advancing and retreating the adjustment screw 154 by turning it, the base end 151 of the elevation angle adjustment metal fitting 150 is pivoted with respect to the receiving metal fitting 142 about the attachment screws 153. Accordingly, by turning the adjustment screw 154, the elevation angle of the antenna device 200 can be adjusted.

Figure 2:
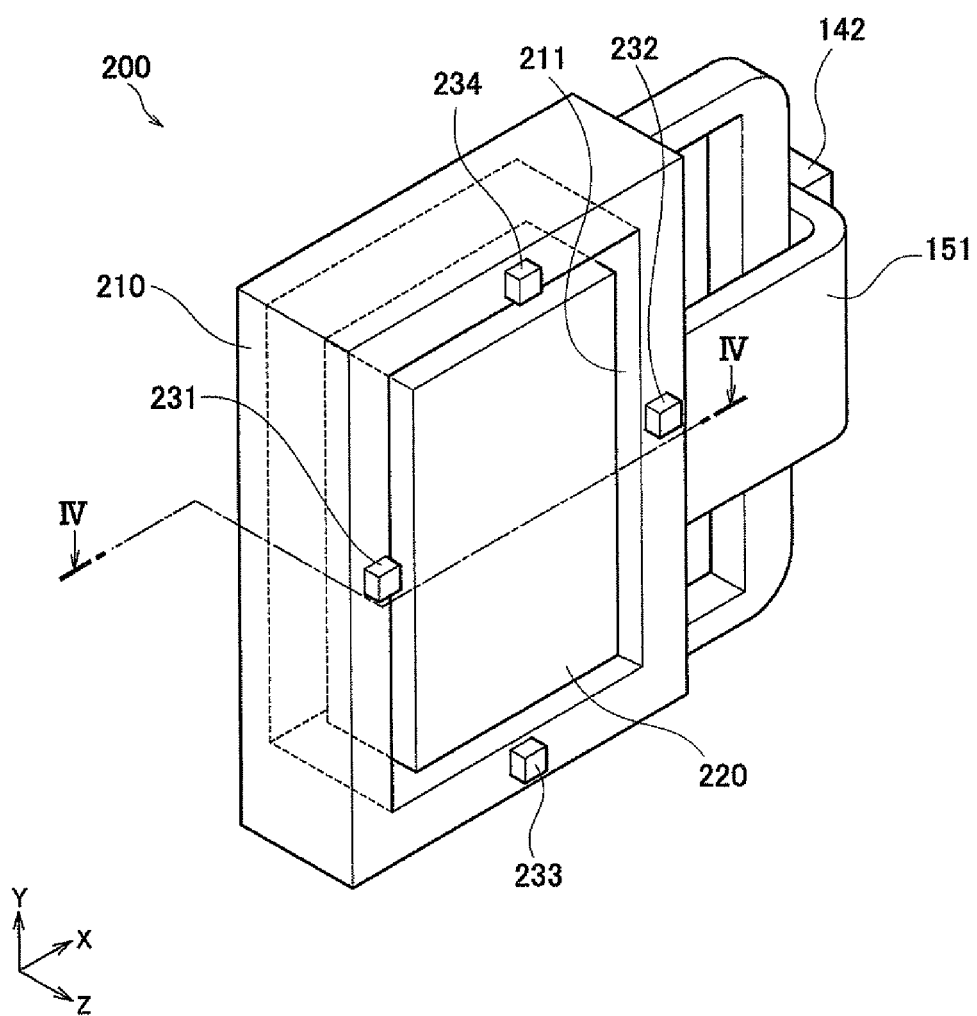
FIG. 2 is a perspective view of the antenna device seen from the front side.
Figure 3:
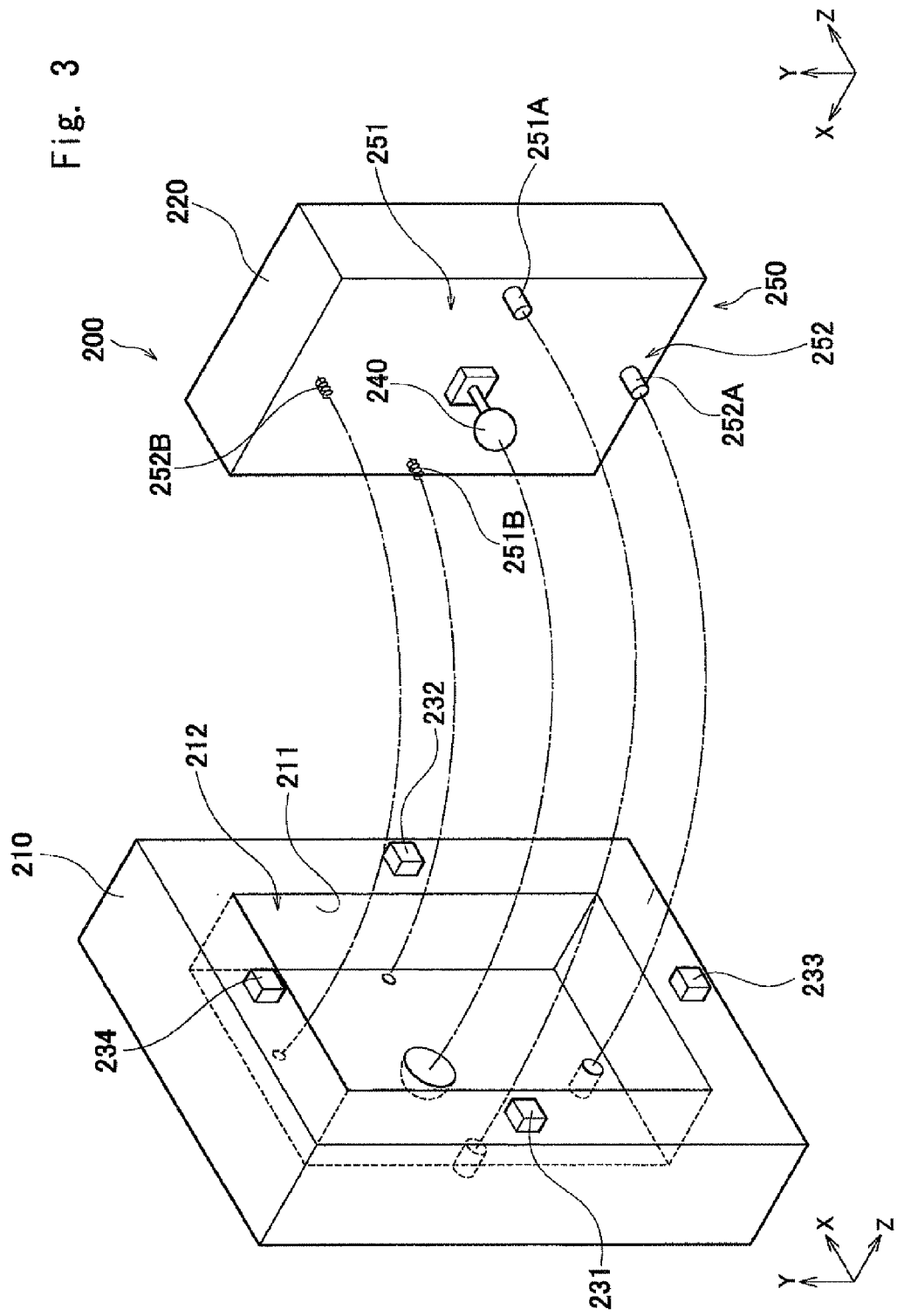
FIG. 3 is an exploded perspective view of the antenna device.

FIG. 2 is a perspective view of the antenna device 200 seen from the front side. FIG. 3 is an exploded perspective view of the antenna device 200.

The antenna device 200 includes a housing unit 210, an antenna unit part 220, a variation detection means 230, a movable coupling means 240, an angle adjustment means 250, and a controller 300.

Figure 4:
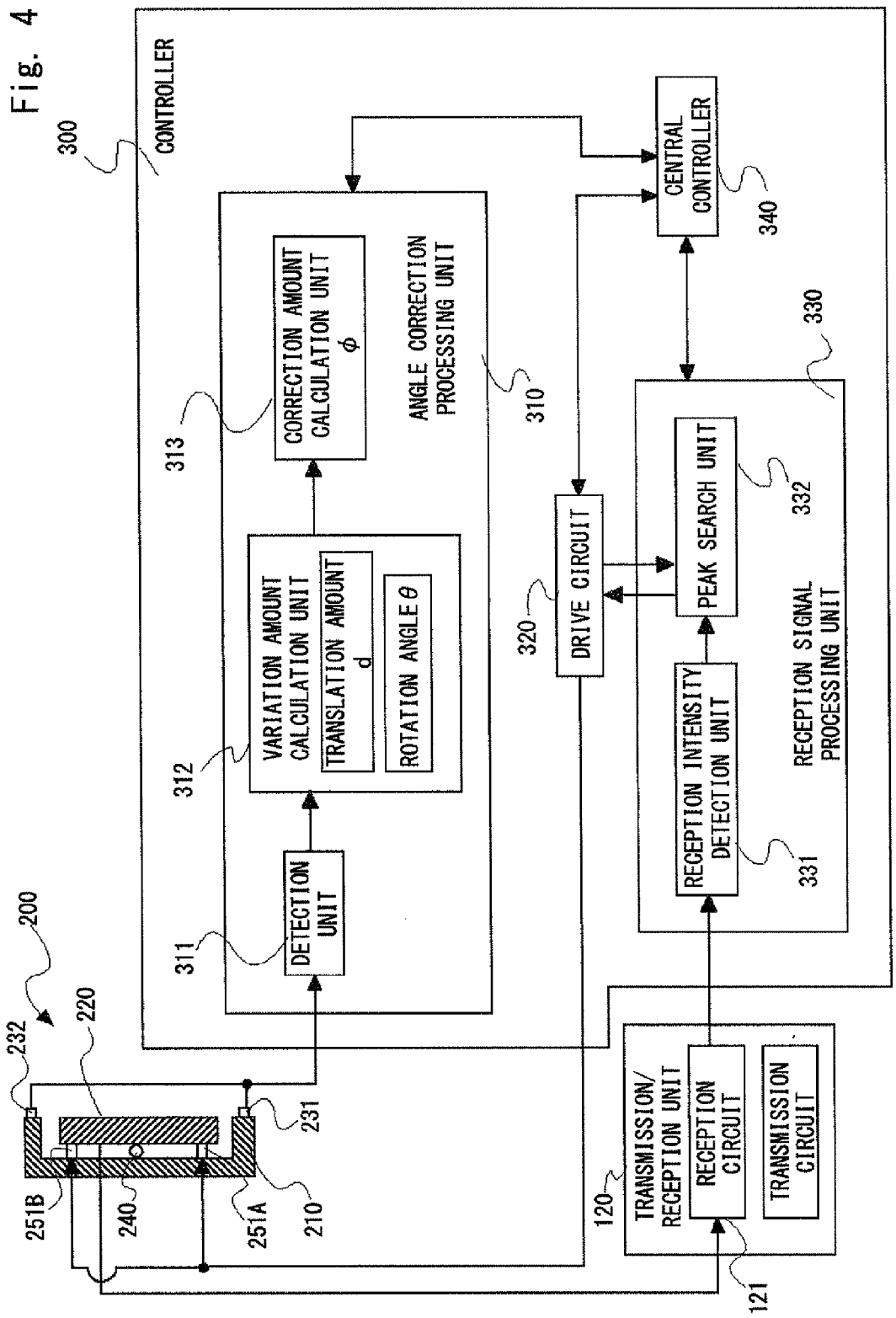
FIG. 4 is a functional block diagram of a controller.

FIG. 4 shows a functional block diagram of the controller 300.

The overall shape of the housing unit 210 is a rectangular parallelepiped and it has one surface having an opening 211, which has a straight concave shape. (That is, the housing unit 210 has a rectangular box shape.) Since the antenna unit part 220 is housed in this concave part in such a manner that the antenna unit part 220 can be swung, the space formed of this concave is referred to as a housing space 212.

The antenna unit part 220 includes an antenna body unit and an outdoor unit that are integrally formed. The antenna body unit is a planar antenna in this example. The outdoor unit is an electronic circuit having a signal processing function to detect the reception level of a signal received by the antenna body unit (the planar antenna) and down-convert the frequency of the reception signal. Such an electronic circuit is often called the outdoor unit because it is installed outside together with the antenna body unit. The antenna body unit and the electronic circuit unit installed outside together with the antenna body unit may be collectively called an outdoor unit. Such a naming is not an essential part of the present invention.

The overall shape of the antenna unit part 220 is a rectangular parallelepiped and it has such a size that it is housed in the housing space 212 of the housing unit 210.

The variation detection means 230 specifically includes a plurality of acceleration sensors: a first acceleration sensor 231, a second acceleration sensor 232, a third acceleration sensor 233, and a fourth acceleration sensor 234. The acceleration sensors 231, 232, 233, and 234 are installed on the front surface of the housing unit 210.

As shown in FIG. 2, X, Y, and Z directions of the antenna device are defined. That is, the width direction of the antenna device 200 is denoted by the X direction, the height direction of the antenna device 200 is denoted by the Y direction, and the depth direction of the antenna device 200 is denoted by the Z direction.

The direction in which the azimuth angle is opened by 180 degrees is the X direction and the direction in which the elevation angle is opened by 180 degrees is the Y direction.

The first acceleration sensor 231 and the second acceleration sensor 232 are opposed to each other at the middle of the housing unit 210 in the height direction (Y direction) with the opening 211 therebetween.

That is, the first acceleration sensor 231 and the second acceleration sensor 232 are spaced apart from each other along the X direction in the XZ plane. In order to detect the swing of the antenna device 200 with high accuracy, the first acceleration sensor 231 and the second acceleration sensor 232 are preferably arranged as much as possible in the outer peripheries on the front surface of the housing unit 210. In other words, the first acceleration sensor 231 and the second acceleration sensor 232 are preferably spaced apart from each other as much as possible.

The third acceleration sensor 233 and the fourth acceleration sensor 234 are opposed to each other at the middle of the housing unit 210 in the width direction (X direction) with the opening 211 therebetween. That is, the third acceleration sensor 233 and the fourth acceleration sensor 234 are spaced apart from each other along the Y direction in the YZ plane.

In order to detect the swing of the antenna device 200 with high accuracy, the third acceleration sensor 233 and the fourth acceleration sensor 234 are preferably arranged as much as possible in the outer peripheries on the front surface of the housing unit 210. In other words, the third acceleration sensor 233 and the fourth acceleration sensor 234 are preferably spaced apart from each other as much as possible.

In this example, the acceleration sensors 231-234 are three-axis sensors that detect the accelerations in the x axis, the y axis, and the z axis.

The movable coupling means 240 is specifically a ball joint (see FIG. 3).

As shown in the exploded perspective view of FIG. 3, a pedestal of the ball joint 240 is fixed to about the center of the back surface of the antenna unit part 220. The ball of the ball joint 240 is fit into the bottom surface of the housing space 212 in such a way that the ball is slidably movable. According to this structure, the antenna unit part 220 is housed in the housing space of the housing unit 210 and the antenna unit part 220 can be swung around the ball joint 240 with respect to the housing unit 210.

Besides the ball joint, a universal joint can be used, for example, as the movable coupling means.

An azimuth angle adjustment means 251 and an elevation angle adjustment means 252 are provided as the angle adjustment means 250 (see FIG. 3). The azimuth angle adjustment means 251 is means for adjusting the azimuth angle of the antenna unit part 220. In this example, the azimuth angle adjustment means 251 adjusts the relative azimuth angle of the antenna unit part 220 with respect to the azimuth angle of the housing unit 210.

The azimuth angle adjustment means 251 includes a linear actuator 251A and a spring 251B. Specifically, the linear actuator 251A is a voice coil motor.

The linear actuator 251A and the spring 251B are provided between the back surface of the antenna unit part 220 and the bottom surface of the housing space 212. The linear actuator 251A and the spring 251B are opposed to each other with the ball joint 240 interposed therebetween in the XZ plane. (In other words, the linear actuator 251A and the spring 251B are spaced apart from each other in the X direction with the ball joint 240 interposed therebetween in the XZ plane.) When the linear actuator 251A is a voice coil motor, for example, a yoke (magnet) may be provided on the back surface of the antenna unit part 220 and a coil may be provided on the bottom surface of the housing space 212. When the linear actuator 251A is driven, the antenna unit part 220 pivots (swings) to change the azimuth angle.

The elevation angle adjustment means 252 is means for adjusting the elevation angle of the antenna unit part 220.

In this example, the elevation angle adjustment means 252 adjusts the relative elevation angle of the antenna unit part 220 with respect to the elevation angle of the housing unit 210.

The elevation angle adjustment means 252 includes a linear actuator 252A and a spring 252B. Specifically, the linear actuator 252A is a voice coil motor. The linear actuator 252A and the spring 252B are provided between the back surface of the antenna unit part 220 and the bottom surface of the housing space 212. The linear actuator 252A and the spring 252B are opposed to each other with the ball joint 240 interposed therebetween in the YZ plane.

(In other words, the linear actuator 252A and the spring 252B are spaced apart from each other in the Y direction with the ball joint 240 interposed therebetween in the YZ plane.)

When the linear actuator 252A is a voice coil motor, for example, a yoke (magnet) may be provided on the back surface of the antenna unit part 220 and a coil may be provided on the bottom surface of the housing space 212. When the linear actuator 252A is driven, the antenna unit part 220 pivots (swings) to change the elevation angle.

A voice coil motor is preferably used as the linear actuator in consideration of the drive accuracy and the length of a stroke. Besides the voice coil motor, a piezoelectric actuator or a piezoelectric element having a displacement enlarging mechanism may be used as the linear actuator.

Further, when the linear actuators 251A and 252A are arranged closer to the ball joint 240, the rotation angle of the antenna unit part 220 with respect to the drive amount of the linear actuators 251A and 252A increases.

In this above case, a high-speed drive and a high-speed response can be achieved. In contrast, when the linear actuators 251A and 252A are arranged apart from the ball joint 240, the rotation angle of the antenna unit part 220 with respect to the drive amount of the linear actuators 251A and 252A decreases. In this case, a high-accuracy drive can be achieved. It is difficult to quantitatively define whether the linear actuators 251A and 252A are arranged closer to the ball joint 240 or they are arranged apart from the ball joint 240. As one example, the distance between the ball joint 240 and the outer periphery of the antenna unit part 220 may be divided into three equal parts, and it can be said that "the linear actuators are arranged close to the ball joint" when the linear actuators 251A and 252A are in the section closer to the ball joint 240 and "the linear actuators are arranged apart from the ball joint" when the linear actuators are in the section closer to the outer periphery of the antenna unit part.

FIG. 4 shows a functional block diagram of the controller 300. The controller 300 is included in the antenna unit part 220 as a part of the outdoor unit. The controller 300 includes an angle correction processing unit 310, a drive circuit 320, a reception signal processing unit 330, and a central controller 340.

The angle correction processing unit 310 includes a detection unit 311, a variation amount calculation unit 312, and a correction amount calculation unit 313.

The detection unit 311 detects output signals from the acceleration sensors 231-234. The variation amount calculation unit 312 calculates the variation amount of the antenna device 200 based on the signals from the detection unit 311. A translation amount (d) and a rotation angle (θ) are obtained as the variation amount of the antenna device 200. As one example, regarding the translation amount (dx) along the x direction and the rotation angle (θy) regarding the orientation, the variation amount of the antenna device 200 can be obtained as follows.

Figure 6:
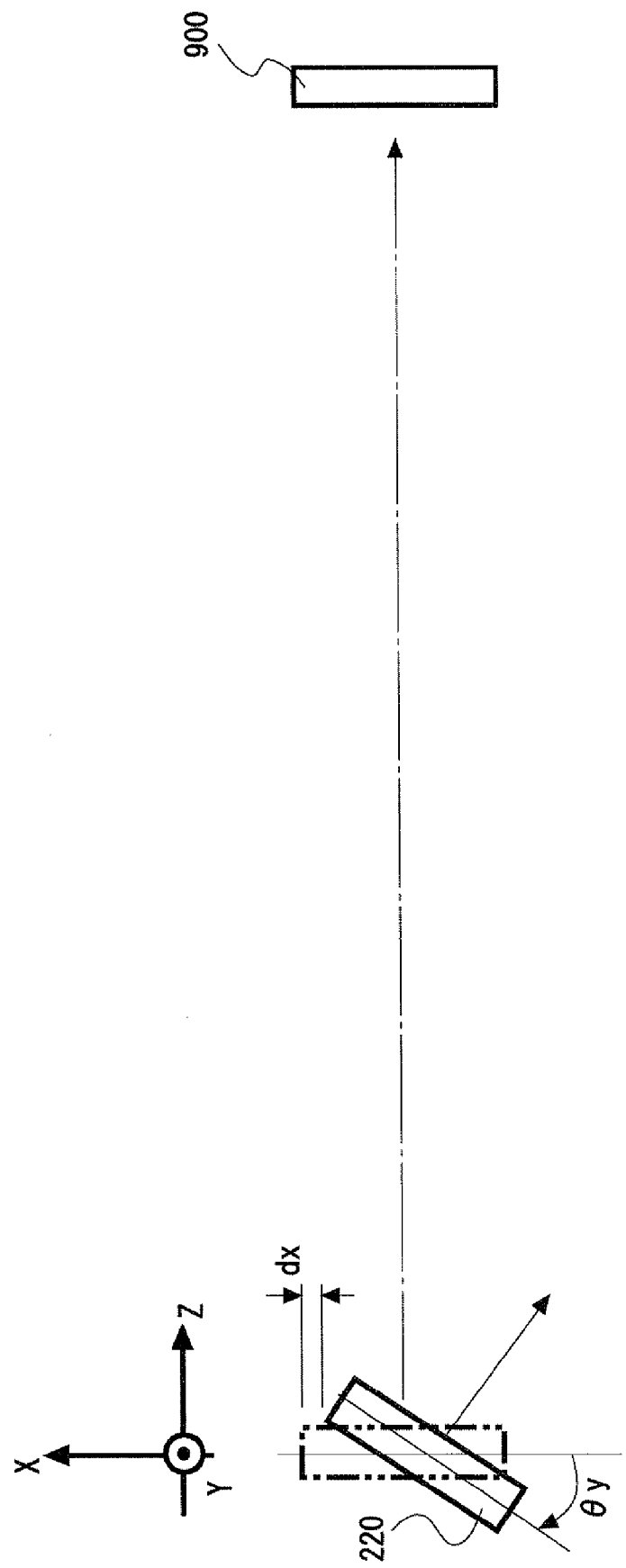
FIG. 6 is a diagram showing a state in which the antenna device is translated by dx along an x direction and is rotated by θy around a Y axis.

(Since the rotation regarding the orientation is the rotation about the Y axis, it is denoted by θy.) FIG. 6 shows a state in which the antenna unit part 220 is displaced by dx in the X direction and rotated by θy about the Y axis as an example.

The translation amount (dx) along the x direction is obtained by integrating the average value of the x-direction detection value of the first acceleration sensor 231 and the x-direction detection value of the second acceleration sensor 232 twice. Further, the rotation angle (θy) regarding the orientation is calculated based on the difference between the z-direction detection value of the first acceleration sensor 231 and the z-direction detection value of the second acceleration sensor 232, and this difference corresponds to the rotation around the Y axis. Since the size of the antenna device 200 (e.g., the length along the x direction) is already known, the rotation angle (θy) regarding the orientation can be obtained by an appropriate conversion.

The correction amount calculation unit 313 calculates a correction rotation amount (φ) that is necessary to cancel the variation amount of the antenna device 200.

That is, the antenna unit part 220 is rotated by the correction rotation amount (φ), whereby the antenna unit part 220 keeps the original direction and faces toward the opposing antenna.

Figure 5:
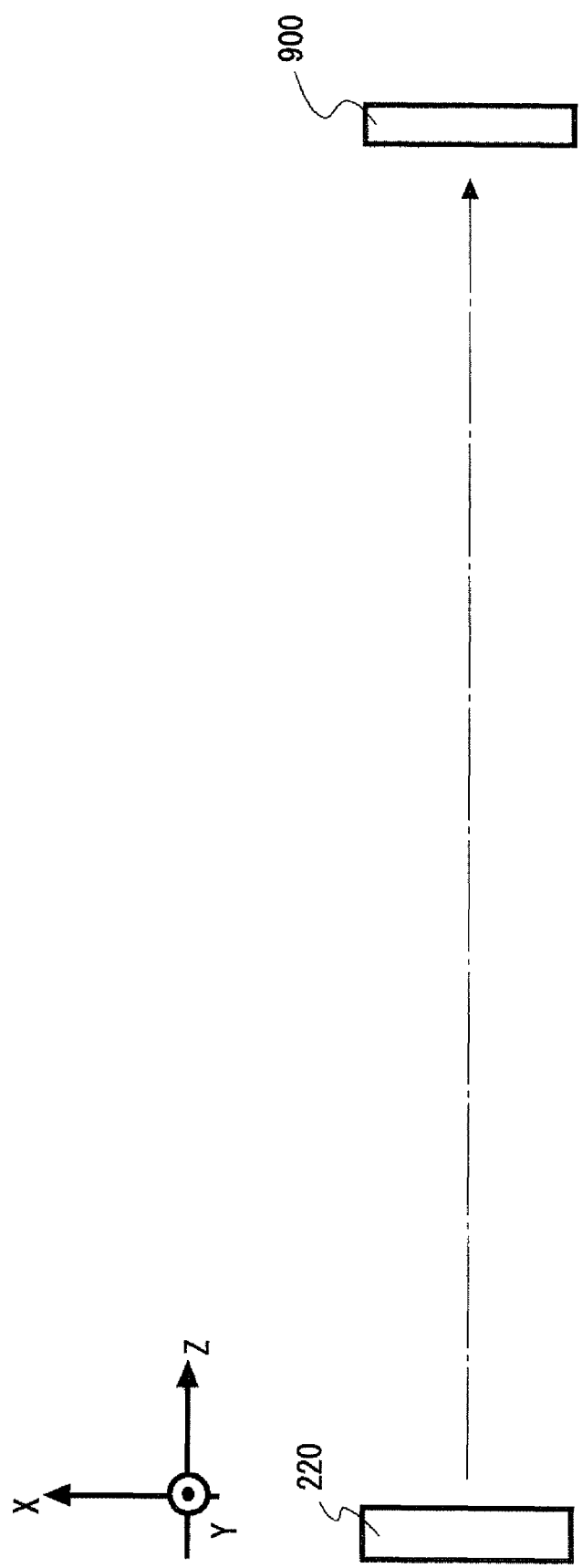
FIG. 5 is a diagram showing a state in which the antenna device and an opposing antenna face each other.
Figure 7:
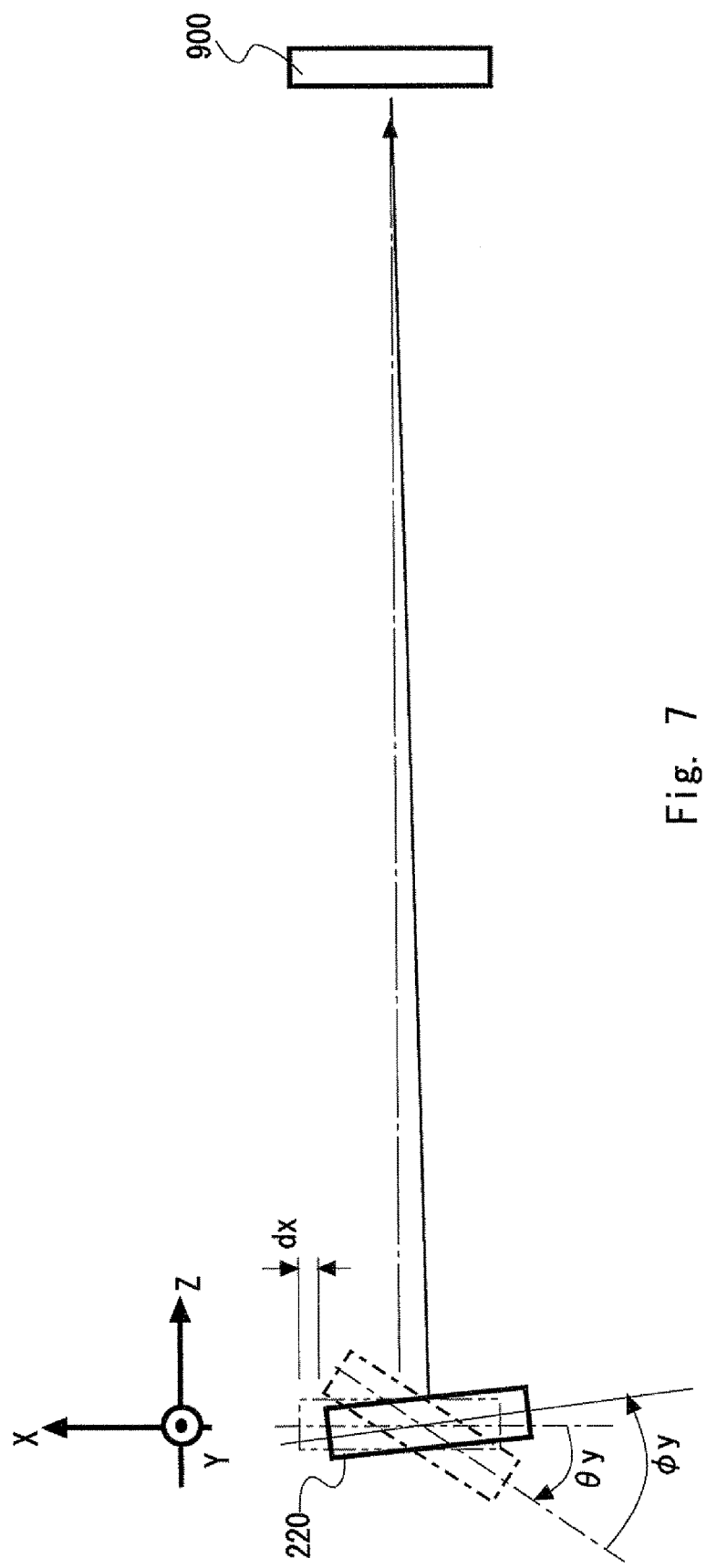
FIG. 7 is a diagram showing a state in which an antenna unit part 220 is rotated by a correction rotation amount (φ)

Referring to FIGS. 5, 6, and 7, descriptions will be given in this order.

FIG. 5 shows a state in which the antenna device 200 and the opposing antenna 900 are opposed to each other. For the sake of clarity of illustration, the housing unit 210 is omitted and only the antenna unit part 220 is shown.

When a disturbance such as wind or an earthquake is imparted to the antenna device 200 in the state shown in FIG. 5, a displacement occurs as shown in FIG. 6. FIG. 6 shows a state in which the translation by dx along the x direction and the rotation of θy around the Y axis occur.

This results in the disconnection of the line between the antenna device 200 and the opposing antenna 900.

The antenna unit part 220 is rotated from the state shown in FIG. 6 by the drive of the linear actuators 251A and 252B to cause the antenna unit part 220 to face toward the opposing antenna 900 as shown in FIG. 7. The correction rotation amount (φ) in this case can be obtained from the following Expression.

Note that L denotes a distance between antennas. The distance between antennas (L) is, for example, about 0.5 km to several tens of km.

Expression 1

$$\varphi_y = -\theta_y - \arctan\left(\frac{d_x}{L}\right) \times \frac{180°}{\pi} \quad \text{(Expression 1)}$$

The correction rotation amount (φ) thus obtained is output to the drive circuit 320. The drive circuit 320 applies a drive current signal to the linear actuators 251A and 252B to rotate the antenna unit part 220 by the correction rotation amount (φ).

By rotating the antenna unit part 220 by the correction rotation amount (φ), a vibration (oscillation) imparted to the antenna device can be cancelled and the antenna unit part 220 always faces toward the opposing antenna 900 (see FIG. 7). It is therefore possible to keep the connection of the communication line even when the antenna device 200 swings because of winds or earthquakes.

It will be clear that the elevation angle direction can be adjusted in a way similar to the adjustment of the azimuth angle direction.

That is, the variation amount calculation unit 312 integrates the average value of the y-direction detection value of the third acceleration sensor and the y-direction detection value of the fourth acceleration sensor twice to calculate the translation amount (dy) along the y direction and calculates the rotation angle (θx) regarding the elevation angle direction based on the difference between the z-direction detection value of the third acceleration sensor and the z-direction detection value of the second acceleration sensor. When the distance between this antenna and the opposing antenna is L, the correction amount calculation unit 313 calculates the correction amount (φx) regarding the elevation angle direction according to the following Expression.

Expression 2

$$\varphi_x = -\theta_x - \arctan\left(\frac{d_y}{L}\right) \times \frac{180°}{\pi} \quad \text{(Expression 2)}$$

The reception signal processing unit 330 includes a reception intensity detection unit 331 and a peak search unit 332. The details of the processing operations of the reception intensity detection unit 331 and the peak search unit 332 will be described later with reference to a flowchart. Further, the central controller 340 controls the whole operation of the controller 300 and more specifically, manages the relation among the operations of the angle correction processing unit 310, the drive circuit 320, and the reception signal processing unit 330. The operation of the central controller 340 will be described later with reference to a flowchart.

Figure 8:
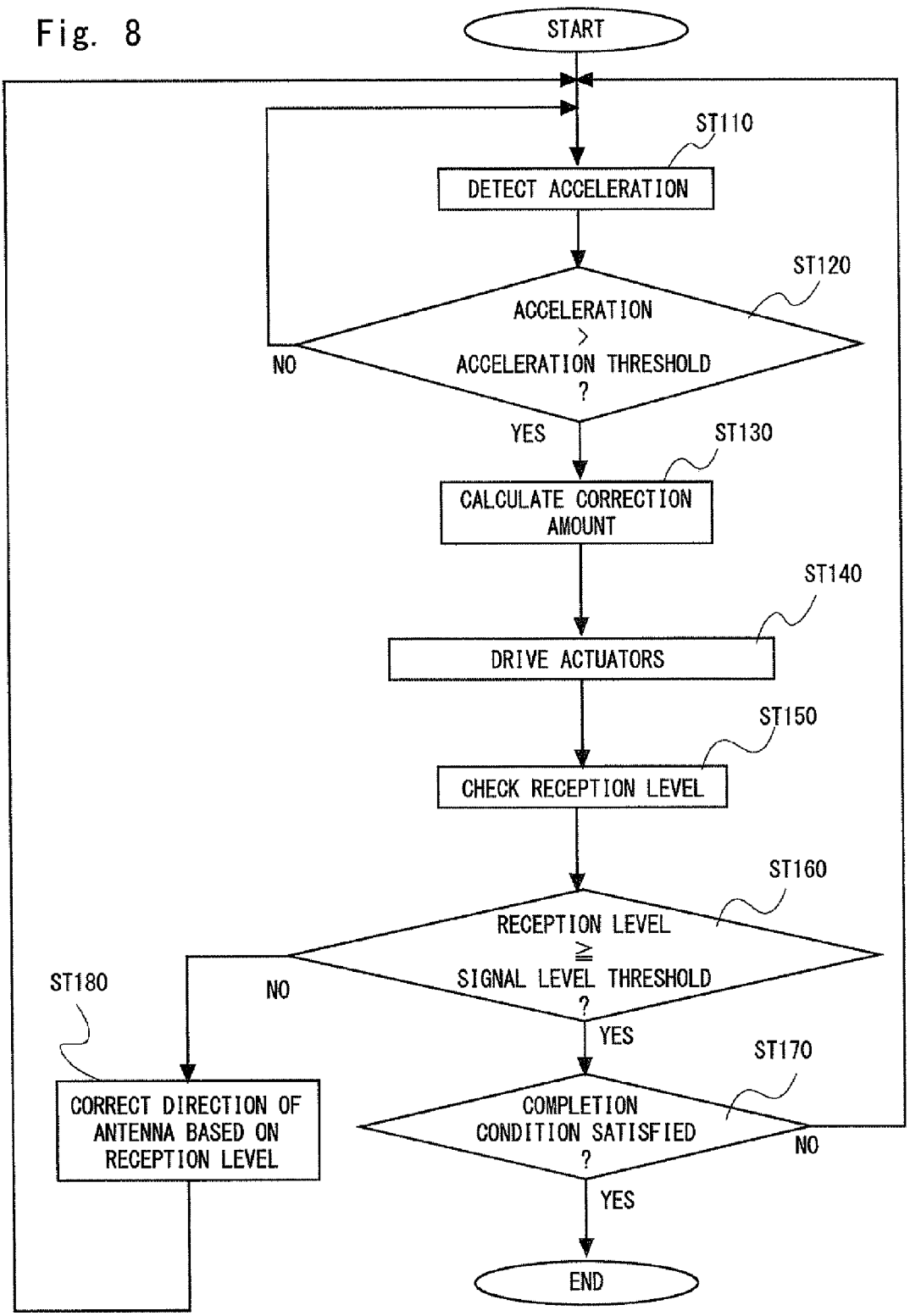
FIG. 8 is a flowchart showing an operation procedure of the controller.

FIG. 8 is a flowchart showing an operation procedure of the controller 300.

First, in ST100, the detection unit 311 detects signals from the acceleration sensors 231-234. It is then determined whether the acceleration that is detected exceeds a predetermined acceleration threshold (ST120). When the acceleration that is detected does not exceed the acceleration threshold, it means that a vibration is not imparted to the antenna device 200 (ST120: NO). In this case, it is not necessary to perform a correction of the angle, and the process goes back to the detection of the acceleration in ST110 to repeat the above processing.

The method of determining the threshold is not particularly limited. One example of determining the threshold is to set an acceleration threshold in the central controller 340, where the threshold determination is carried out.

When it is determined in ST120 that the acceleration that is detected exceeds the acceleration threshold (ST120: YES), the angle needs to be corrected. That is, the correction amount (φ) is calculated (ST130) and the actuators 251A and 252A are driven to correct the direction of the antenna unit part 220 (ST140).

The calculation of the correction amount ($\varphi$) by the angle correction processing unit 310 has been described above.

After the actuators 251A and 252A are driven and the direction of the antenna unit part 220 is corrected, the reception level is checked (ST150). That is, the reception intensity is detected.

Specifically, the intensity of the signal that can be received in the direction of the antenna unit part 220 after the correction of the direction of the antenna part 220 is detected.

The radio wave signal received by the antenna unit part 220 is sent to the reception intensity detection unit 331 via a transmission/reception unit 120 (reception circuit 121).

The reception intensity detection unit 331 obtains the signal level that has been input. It is then determined whether the signal level exceeds a signal level threshold.

The method of determining the threshold is not particularly limited. One example is to set a signal level threshold in the central controller 340, where the threshold determination is carried out.

When the correction of the angle is appropriately carried out as expected, the reception level should exceed the signal level threshold (ST160: YES).

Accordingly, as long as predetermined completion conditions have not been satisfied (ST170: NO), the process goes back to the detection of the acceleration (ST110) and the above processing is repeated.

When acceleration equal to or above the threshold is detected, ST110-ST170 are repeated and the reception level by the antenna unit part 220 is kept even when a vibration is imparted to the antenna device 200.

However, as a matter of course, the correction of the angle may not be appropriately carried out as expected due to an unexpected disturbance. When it is determined in ST160 that the reception level is below the signal level threshold (ST160: NO), the direction of the antenna needs to be corrected (ST180).

Specifically, the following operation is performed. That is, the drive circuit 320 applies drive signals to the actuators 251A and 252B and the antenna unit part 220 is swung from front to back and from side to side by a predetermined width to adjust the elevation angle and the orientation.

Figure 9:
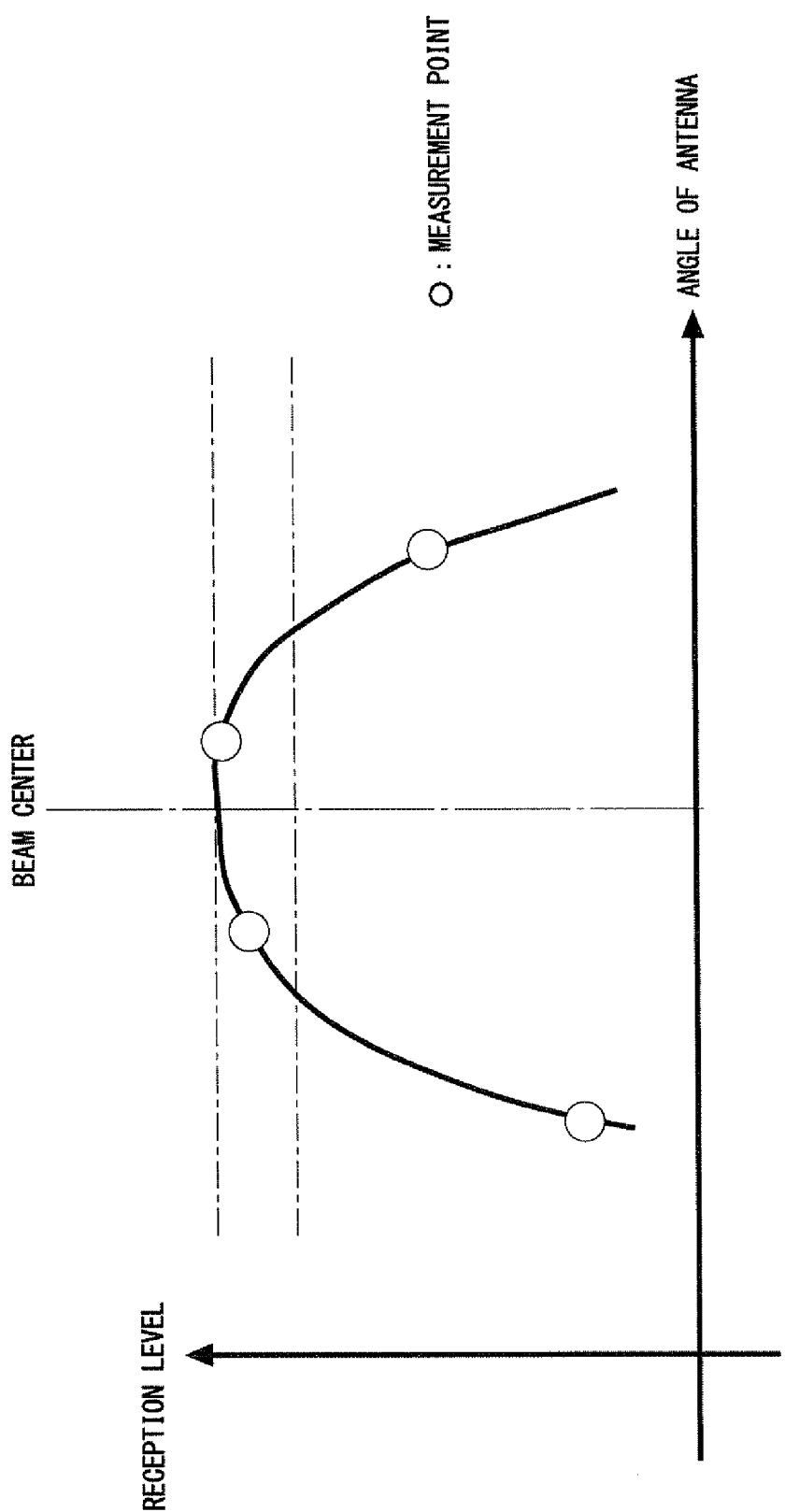
FIG. 9 is a diagram for describing a state of a peak search.

In such a case, when the reception level is recorded at predetermined pitches, data expressed by the graph shown in FIG. 9 can be obtained, for example.

The peak search unit 332 finds from the data the orientation and the elevation angle where the reception level becomes the maximum. The drive circuit 320 then applies drive signals to the actuators 251A and 252B so that the antenna unit part 220 faces toward the orientation and has the elevation angle thus found where the reception level becomes the maximum.

According to the above operation, the reception level is restored to the threshold level or a higher level. Then the process again goes back to the detection of the acceleration (ST110) and repeats ST110-ST170.

Another method to find the orientation where the reception level becomes the maximum may be to find the center of the beam width in the graph shown in FIG. 9. In this case, it is possible to maximize the acceptance of the decrease in the reception level with respect to the displacement in the direction of the antenna.

It will be understood from the above description that the reception level by the antenna unit part 220 can be kept high even in a circumstance where a vibration is imparted to the antenna device 200.

(Supplementary Explanation)

In the above description, the correction rotation amount ($\varphi$) has been expressed by Expression 1.

In a mobile communication system, for example, micro cells having a radius of several hundred meters may be used. In the micro cells, high-frequency radio waves of about 80 GHz may be used.

In this case, the distance between antennas L is about 0.5 km and the beam width is about 0.4 degrees. When the tolerance of the displacement relative to the beam width of 0.4 degrees is set to 0.3 times (ETSI standards), the rotation angle acceptance is +/−0.06 degrees.

If the antenna rotates by only 0.06 degrees when the distance between antennas L is 0.5 km, the displacement corresponds to +/−52 cm. Considering the point that the opposing antenna also vibrates, the acceptance of the translation of the antenna device is about +/−26 cm.

(However, these values are effective only when it is assumed that the antenna does not rotate at all. That is, when it is assumed that the antenna is displaced only by the translation, the acceptance of the translation of the antenna device is about +/−26 cm.)

Based on the above description, the second term on the right side of Expression (1) may be regarded as d<<L and the correction amount ($\varphi$) may be expressed as Expression (3).

$$\varphi = -\theta \quad \text{(Expression 3)}$$

However, due to a further increase in the frequency of radio waves, the beam width tends to become narrower and the distance between antennas L may be further shortened in urban areas. In such a case, the second term on the right side of Expression (1) makes a great contribution and thus the correction of the angle of the antenna by Expression (1) is required, not the approximation as shown in Expression (3).

Modified Example 1

The first exemplary embodiment is one example of the present invention and the following modified examples are also within the scope of the present invention.

In the above first exemplary embodiment, the planar antenna and the outdoor unit are collectively referred to as the antenna unit part 220 and the antenna unit part 220 is housed in the housing unit 210 in such a way that the antenna unit part 220 can be oscillated.

Figure 10:
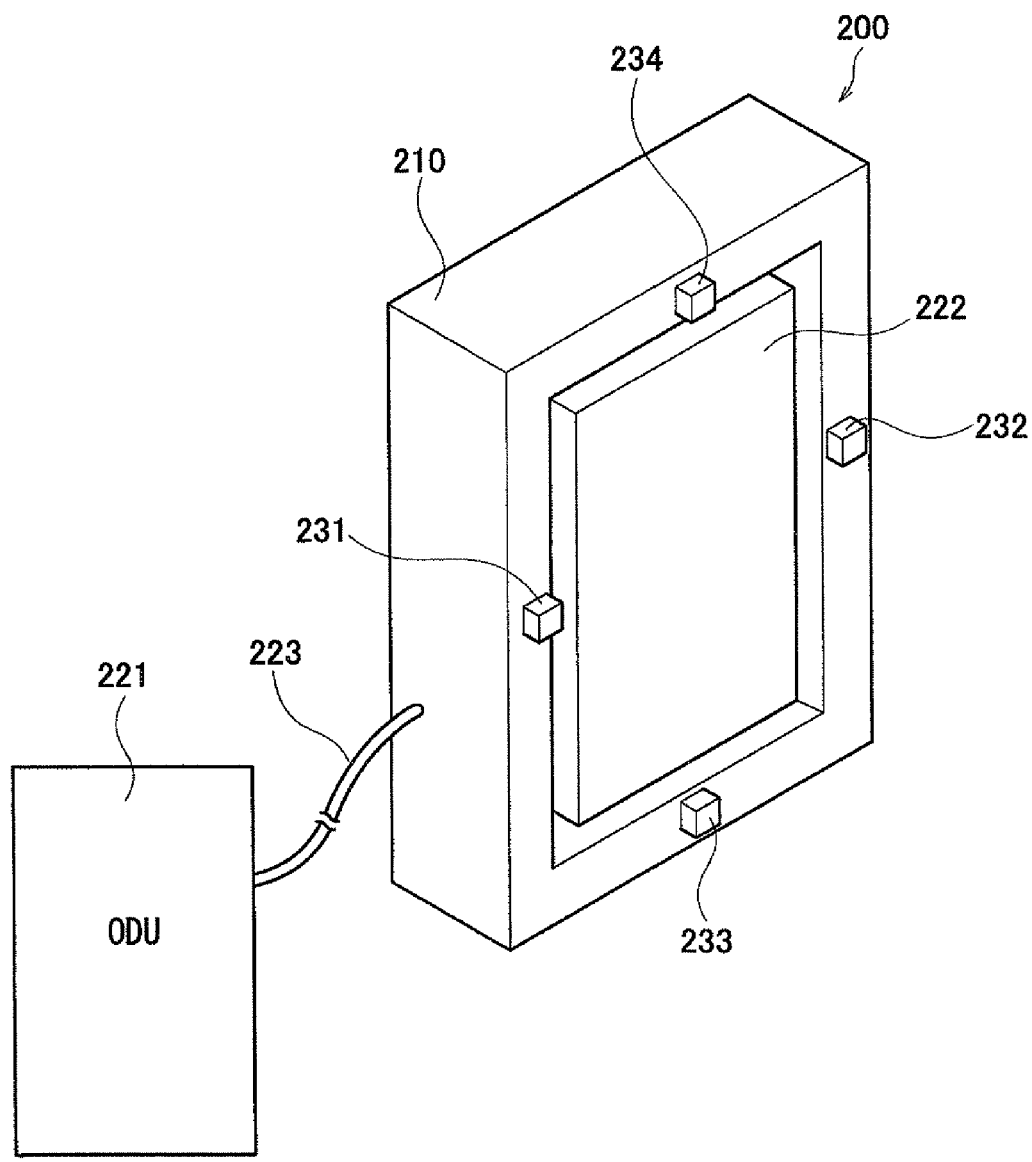
FIG. 10 is a diagram showing a modified example.

The place where the outdoor unit is provided is not an essential part of the present invention. Accordingly, as shown in FIG. 10, the outdoor unit 221 may be arranged outside the antenna device 200 and the antenna device 200 and the outdoor unit 221 may be connected by a cable 223.

Figure 11:
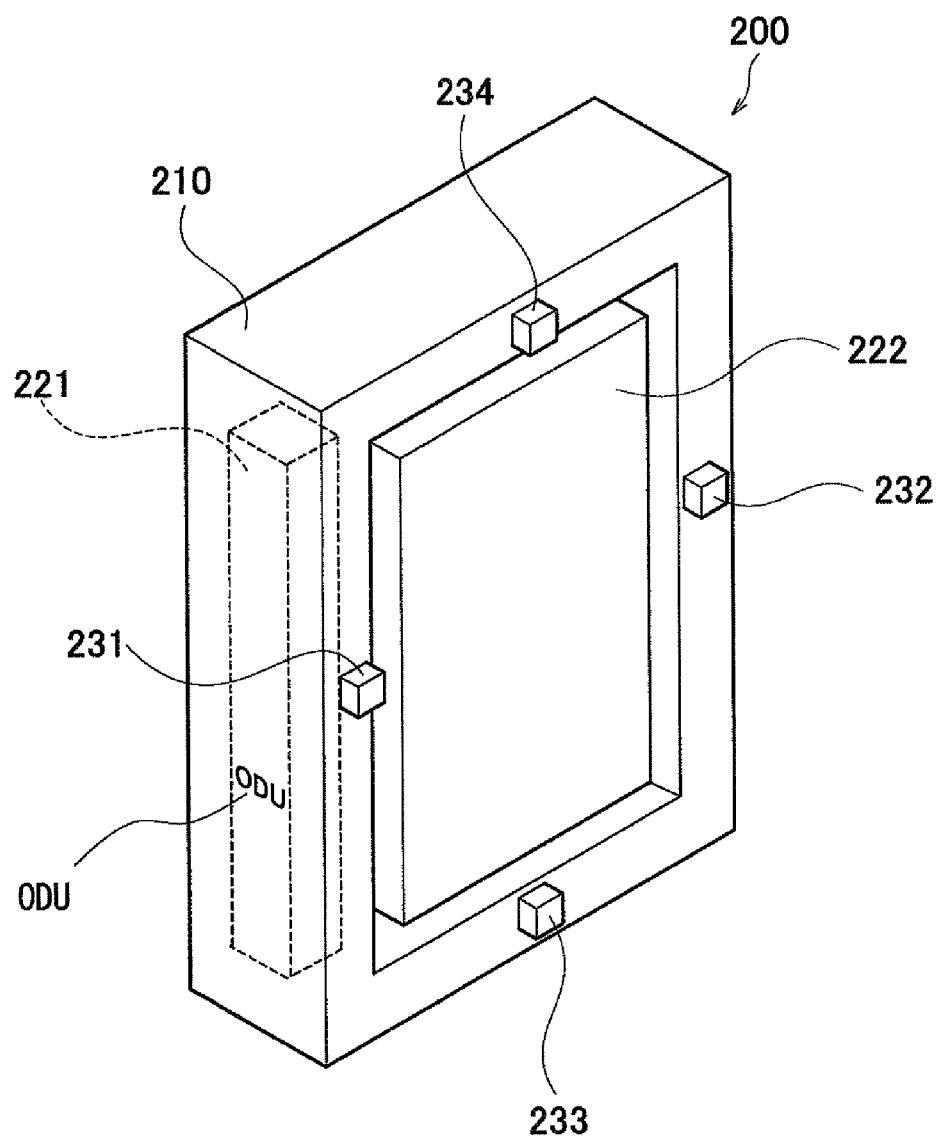
FIG. 11 is a diagram showing the modified example.

In this case, the antenna unit part is formed of a single planar antenna 222. Otherwise, as shown in FIG. 11, the outdoor unit 221 may be included in the housing unit 210.

In the above first exemplary embodiment, the angle adjustment means 250 includes the combination of the linear actuators 251A and 252A and the springs 251B and 252B.

Figure 12:
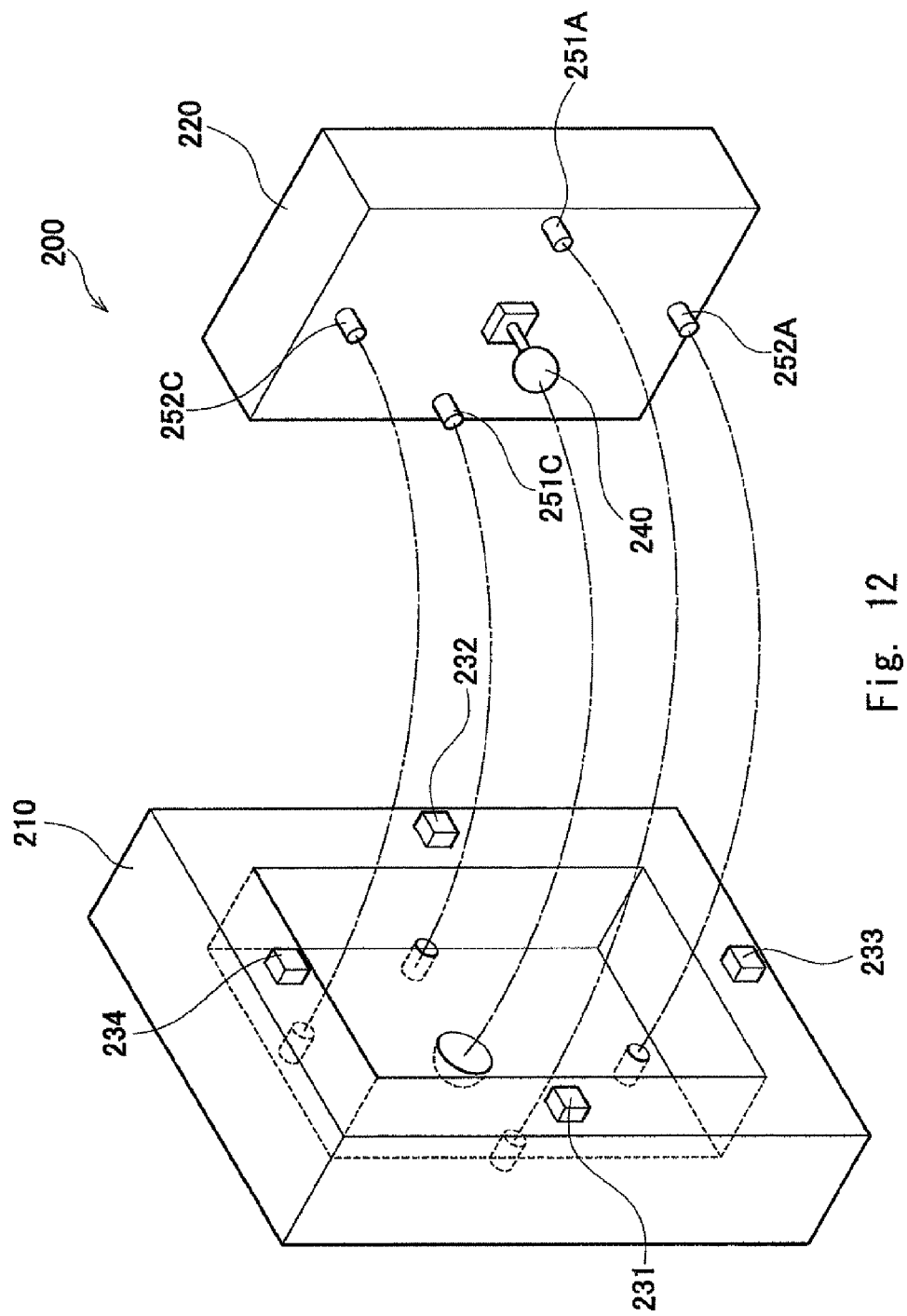
FIG. 12 is a diagram showing the modified example.

Regarding this point, for example, as shown in FIG. 12, linear actuators 251C and 252C may be used in place of the springs 251B and 252B. In this case, the linear actuators 251A and 251C and the linear actuators 252A and 252C opposed to each other with the ball joint 240 interposed therebetween may be differentially driven.

While the acceleration sensors 231-234 are arranged as the variation detection means in the first exemplary embodiment, as shown in FIG. 13, an angular acceleration sensor 253 may be used instead of using the acceleration sensors. This angular acceleration sensor 253 is able to detect the angular acceleration in the azimuth angle direction (AZ) and the angular acceleration in the elevation angle direction (EL).

Since it is impossible to obtain the translation amount of the antenna device 200 only from the angular acceleration sensor 253, the correction amount ($\varphi$) in this case is expressed by $\varphi=-\theta$, where $\theta$ denotes the rotation angle of the antenna device obtained from the angular acceleration that has been detected.

Figure 14:
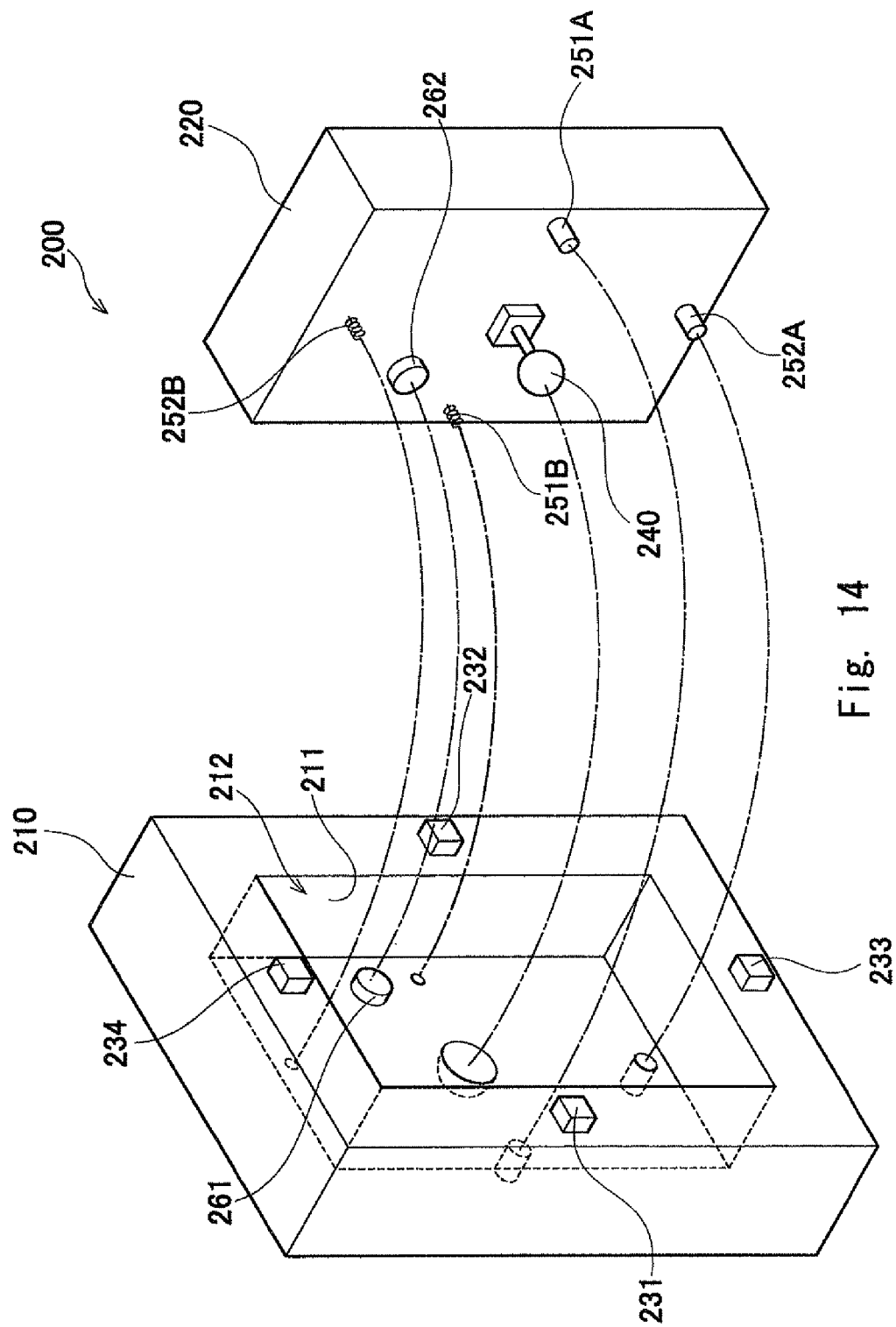
FIG. 14 is a diagram showing the modified example.

As shown in FIG. 14, a relative position detection means 260 for detecting the relative angle of the antenna unit part 220 with respect to the housing unit 210 may be provided.

In the example shown in FIG. 14, the relative position detection means 260 is capacitance-type gap detection means, a fixed-side electrode 261 is provided on the bottom surface of the housing space 212, and a movable-side electrode 262 is provided on the back surface of the antenna unit part 220.

The sensors as the variation detection means are preferably provided in the housing unit 210, as shown in the above exemplary embodiment. This is because, since the antenna unit part 220 is driven by the angle adjustment means, if the sensors are provided in the antenna unit part 220, these sensors detect a combination of the vibration in the antenna device due to a disturbance and an operation of the antenna unit part due to the drive of the angle adjustment means.

Figure 15:
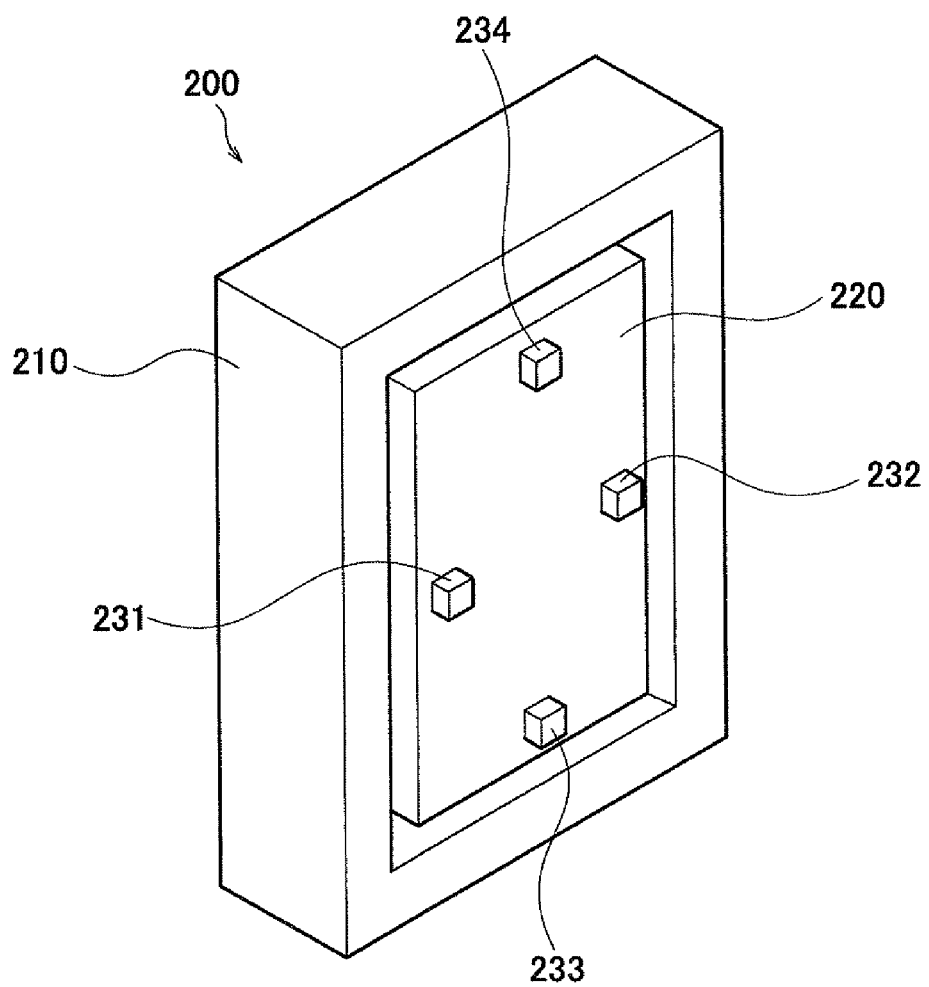
FIG. 15 is a diagram showing the modified example.

Since the vibration in the antenna device due to a disturbance and the operation of the antenna unit part due to the drive of the angle adjustment means can be separated from each other by signal processing, the sensors 231-234 may be provided in the antenna unit part, as shown in FIG. 15.

Figure 16:
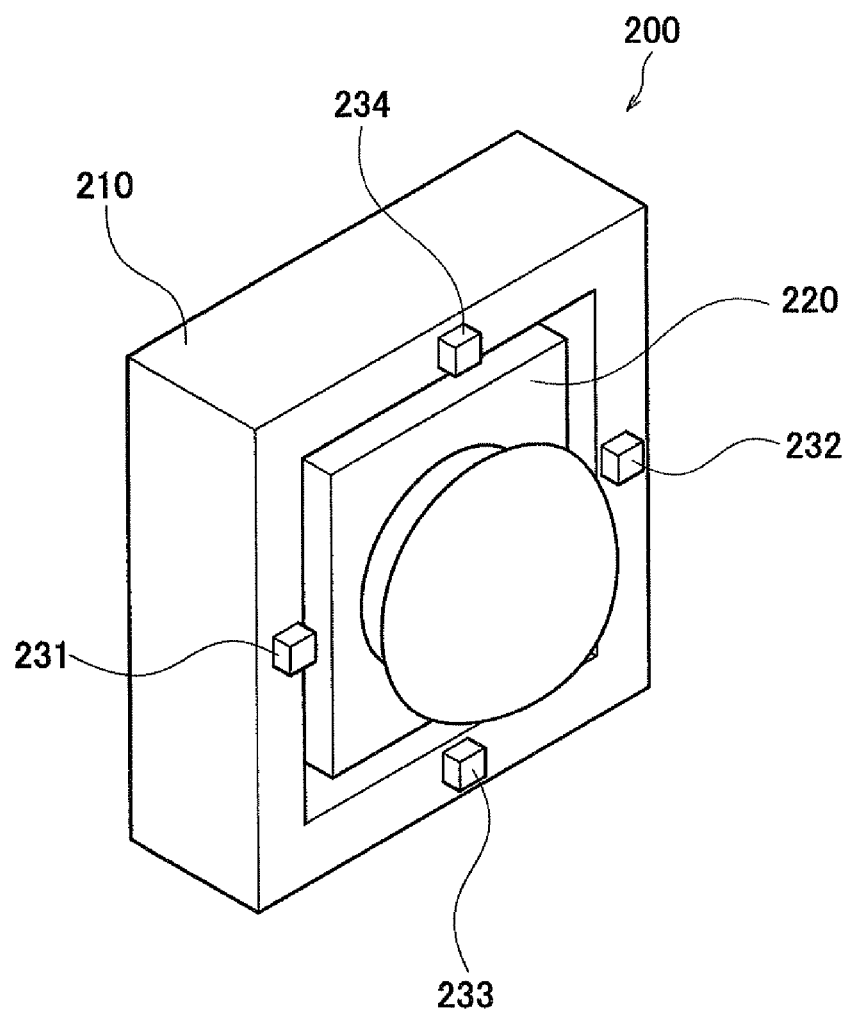
FIG. 16 is a diagram showing the modified example.

Needless to say, the antenna is not limited to the planar antenna and may be a parabolic antenna as shown in FIG. 16.

It is sufficient that the angle adjustment means is able to oscillate the antenna unit part and various kinds of motors may be used as the angle adjustment means. A linear motor or an ultrasonic motor may be used, for example. When the linear motor is used, the linear motor that draws the trajectory of an arc shape is preferably used.

In the controller 300, each of the angle correction processing unit 310 and the reception signal processing unit 330 may be a dedicated hardware formed of logical elements or the like.

Otherwise, a predetermined program may be incorporated in a computer including a central processing unit (CPU), a memory (storage device) and the like to achieve functions as the function units 310-340 of the controller 300.

A program may be installed into the memory of the computer via a recording medium such as a CD-ROM, a memory card or the like or communication means such as the Internet, and the computer including the CPU and the memory may operate the CPU or the like by the program that is installed to operate each function unit.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Modified Example 2

In the first exemplary embodiment, the reception level (reception intensity) has been used to determine whether the correction of the direction of the antenna unit part 220 is appropriately executed (ST150 and ST160 in FIG. 8).

As another modified example, instead of using the reception level (reception intensity), a bit error rate (BER) or a signal-to-noise-plus-interference ratio (SNIR) may be used.

Figure 17:
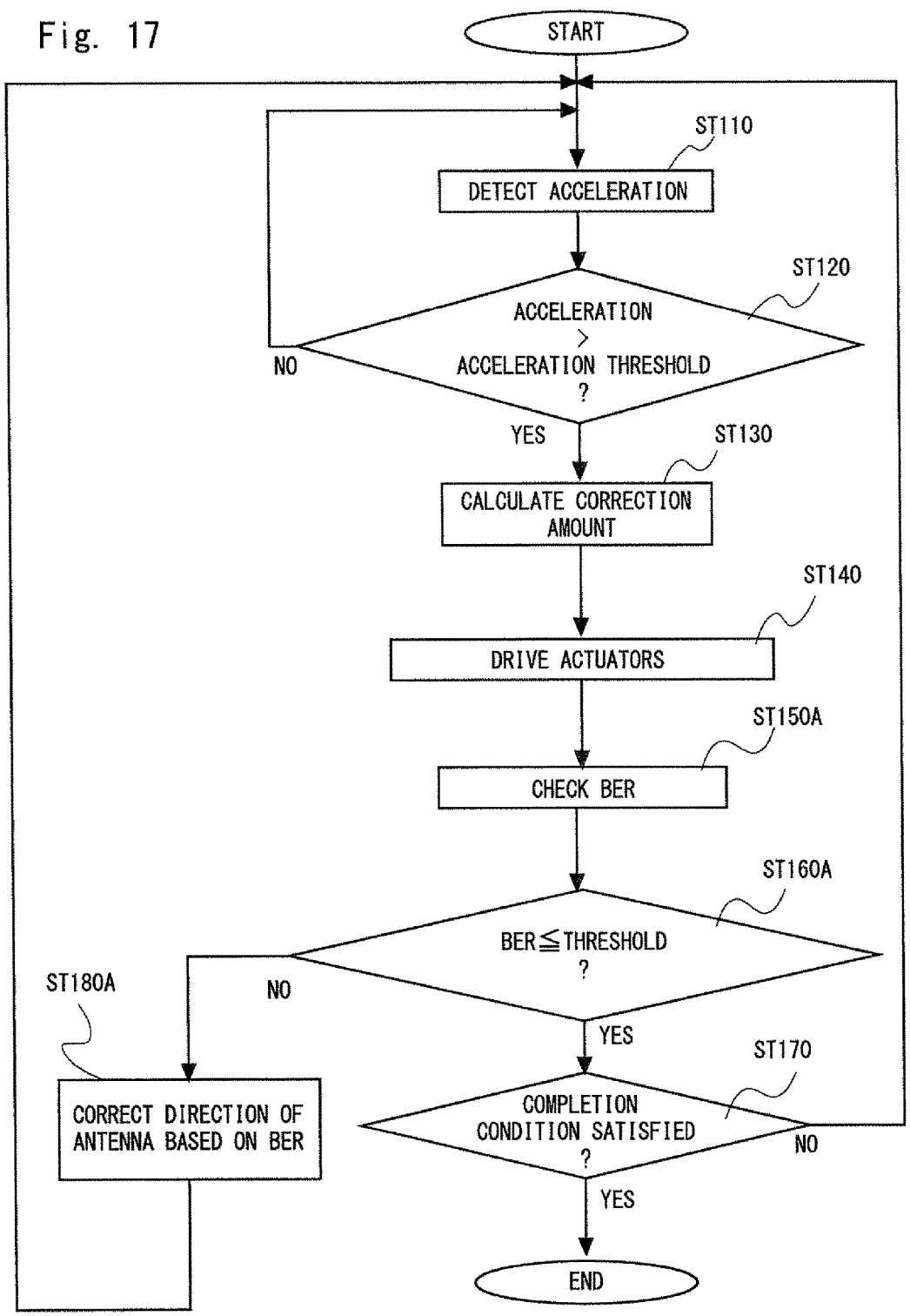
FIG. 17 is a flowchart for describing a Modified example 2.

FIG. 17 shows a flowchart of a case in which the bit error rate (BER) is used in place of the reception level (reception intensity).

In ST150A, the BER is acquired, and in ST160A it is determined whether the BER is equal to or lower than a predetermined threshold. When it is determined in ST160A that the BER exceeds the predetermined threshold, the antenna unit part 220 is swung a predetermined width and the antenna unit part 220 is oriented to the direction in which the BER becomes the lowest (ST180A).

As described above, even when the BER or the SNIR is used in place of the reception level (reception intensity), effects similar to those obtained when the reception level is used can be obtained.

Modified Example 3

In the above exemplary embodiment, the configuration in which vibration (oscillation) imparted to the antenna device 200 is cancelled has been described. This may be called an active vibration removal.

As a matter of course, it is further preferable that a vibration in the antenna be suppressible. One method is to add an elastic body for passive vibration isolation.

Figure 18:
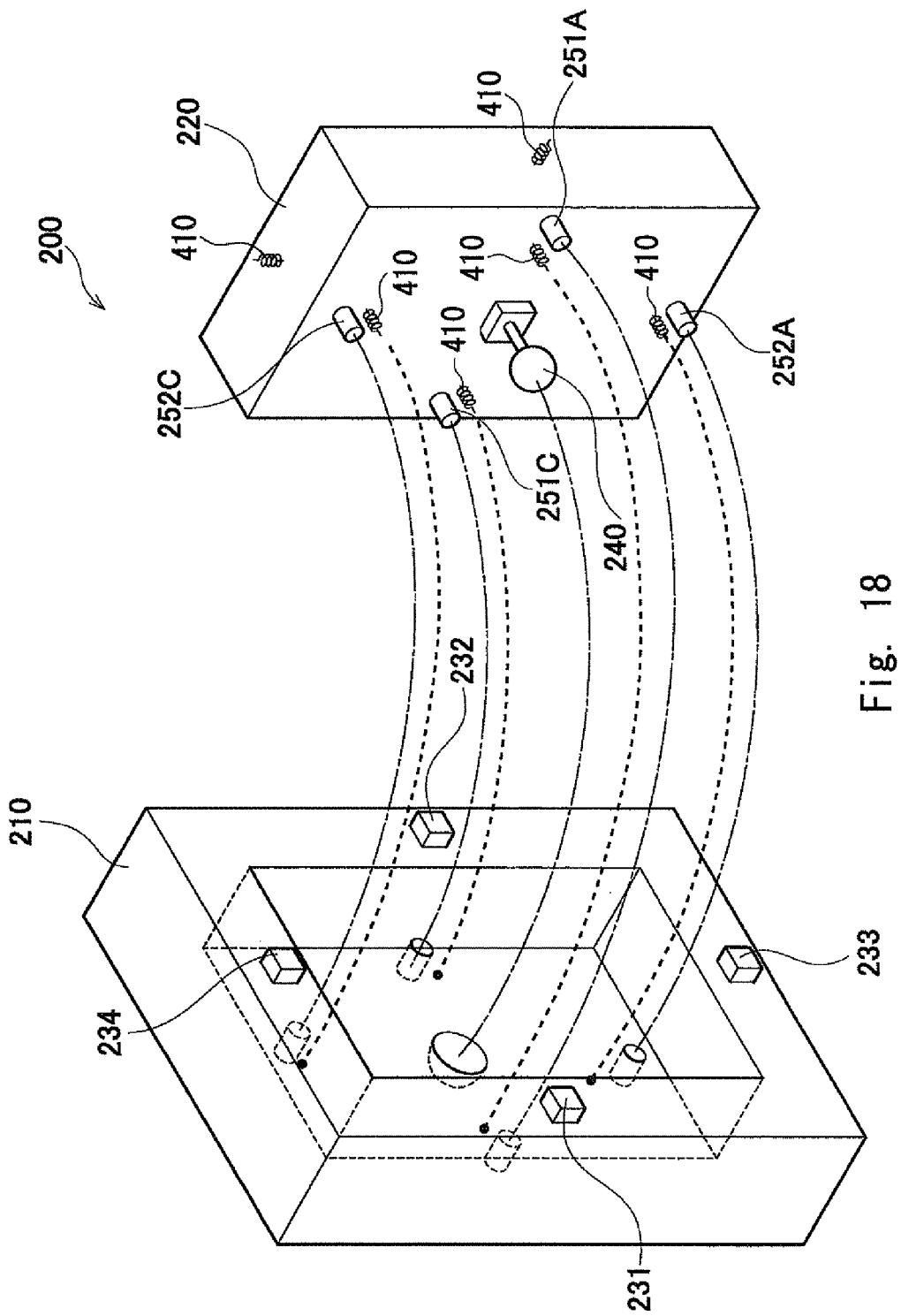
FIG. 18 is a diagram for describing a Modified example 3.

FIG. 18 shows an example in which a spring is interposed between the housing unit 210 and the antenna unit part 220 as a vibration-isolating elastic body.

Four springs 410 are provided on the back surface of the antenna unit part 220 and other springs 410 are further provided on the respective side surfaces of the antenna unit part 220.

Second Exemplary Embodiment

A second exemplary embodiment according to the present invention will be described.

One characteristic of the second exemplary embodiment is that the drive direction of the antenna unit part 220 is limited to the elevation angle direction (EL direction).

The reason why the drive direction of the antenna unit part 220 is limited to the elevation angle direction (EL direction) will be briefly described.

Figure 19:
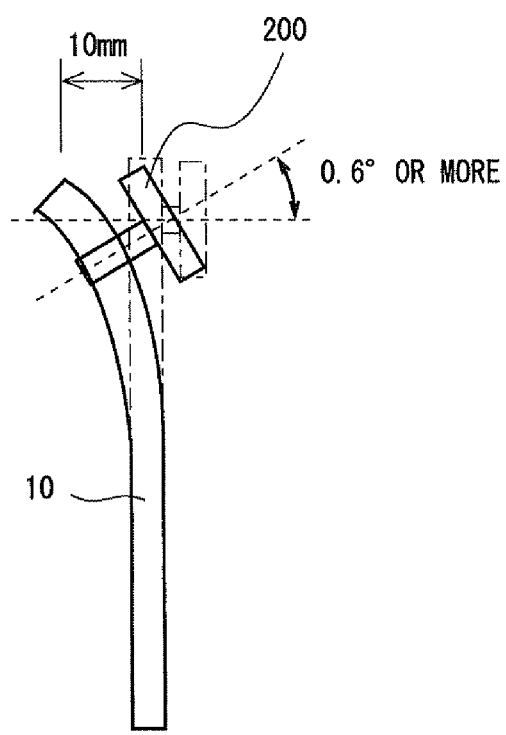
FIG. 19 is a diagram showing a state in which the pole is deflected.

As shown in FIG. 19, it is assumed that the antenna device 200 is attached to the pole 10 and a vibration is imparted to the pole 10 due to an influence of wind or the like. When the vibration is imparted to the pole 10, the pole 10 is deflected. It is assumed, for example, that the pole having a height of 10 m is deflected and the upper end is displaced by about 10 mm, as shown in FIG. 19. In this case, according to a simple linear approximation, the transmission/reception direction of the antenna unit part is displaced by about 0.6 degrees in the EL direction (direction in the elevation angle, elevation angle and depression angle). In reality, the pole 10 is deflected by multiple-order curves, which means that the displacement in the direction of the antenna unit part is much larger. When the pole 10 is deflected and the transmission/reception direction of the antenna unit part 110 is displaced by 0.6 degrees or more, the communication quality is degraded. It is therefore required to take measures to prevent such deflection.

Besides being deflected, the pole 10 can be twisted. However, the amount of twisting is expected to be smaller than the amount of deflection. The pole 10 may be made somewhat thicker, for example, to prevent the pole 10 from being twisted.

Figure 20:
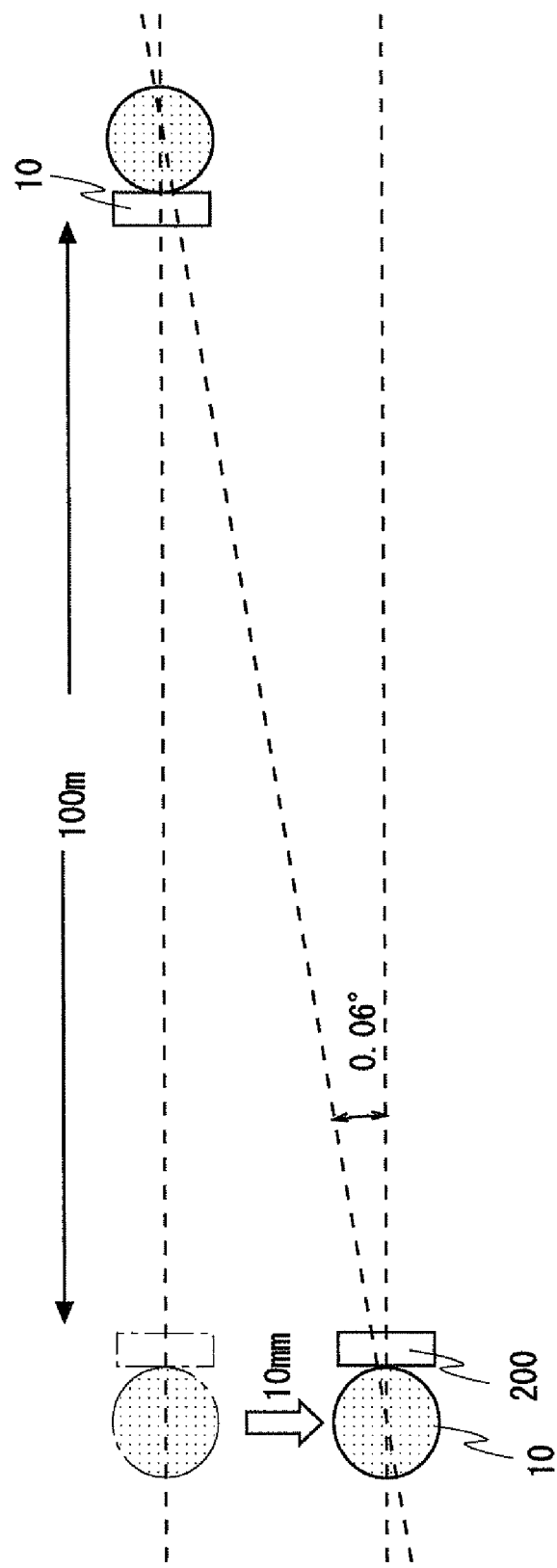
FIG. 20 is a diagram showing a state in which the antenna device is translated due to a vibration of the pole.

One might ask if the antenna device 200 is translationally moved (translated) when a relatively large vibration is imparted to the pole 10. Assume, for example, as shown in FIG. 20, that the distance between the antenna device 200 and the opposing station 20 is 100 m and the antenna device 200 is translated by 10 mm in the horizontal direction. The deviation in the direction in this case is about 0.06 degrees, which does not greatly affect the communication quality compared to the displacement in the direction due to the deflection stated above.

Accordingly, the present inventors have reached the conclusion that the drive direction of the antenna unit part 220 can be limited to the elevation angle direction (EL direction).

Figure 21:
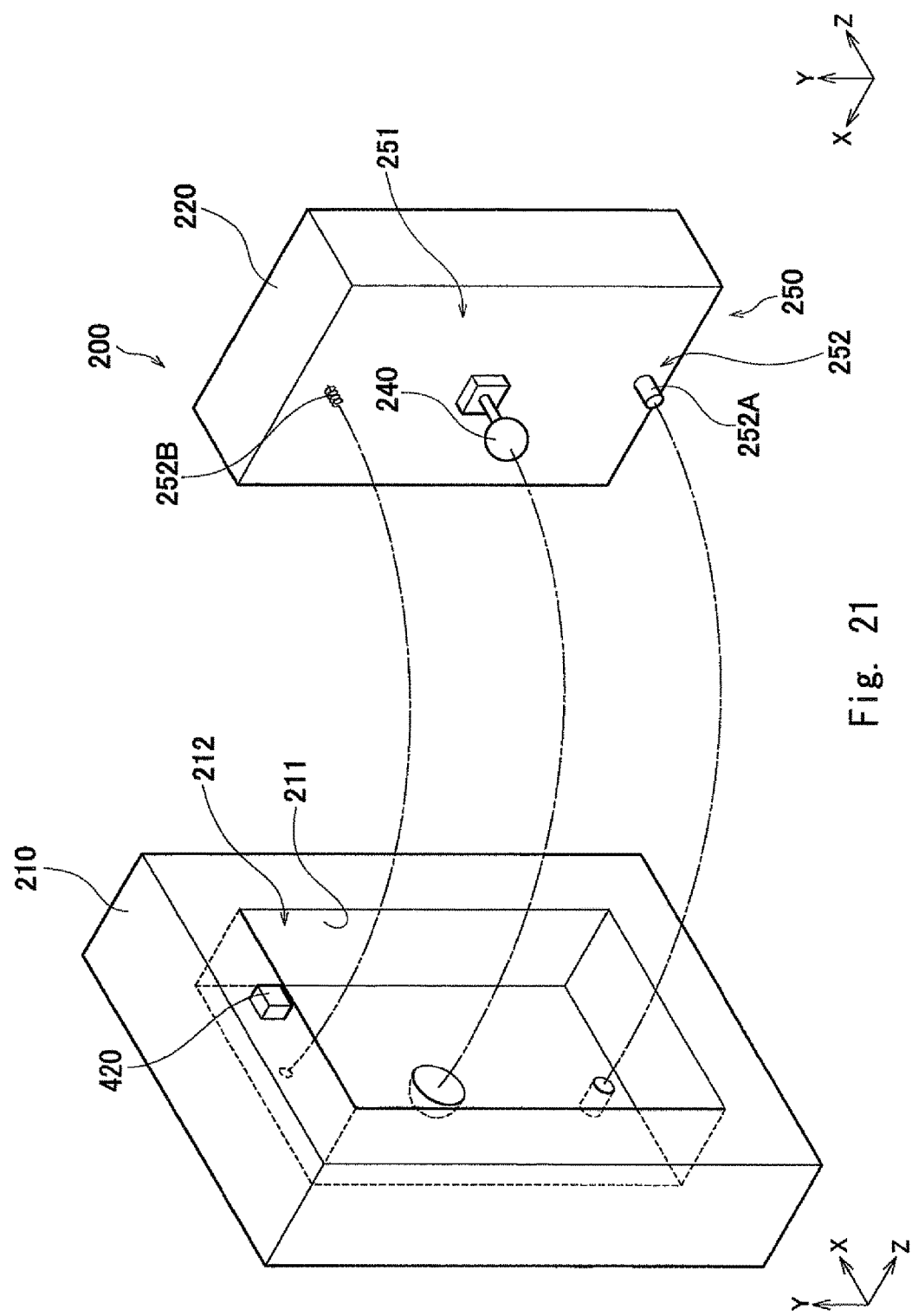
FIG. 21 is a diagram showing a second exemplary embodiment.

FIG. 21 shows the second exemplary embodiment.

Compared to FIG. 3 according to the first exemplary embodiment, FIG. 21 does not show the linear actuator 251A and the spring 251B as the azimuth angle adjustment means 251. On the other hand, the linear actuator 252A and the spring 252B as the elevation angle adjustment means 252 are shown in FIG. 21.

Further, while the acceleration sensors 231-234 have been included as the acceleration detection means in the first exemplary embodiment, a tilt angle sensor 420 is included in place of the acceleration sensors in the second exemplary embodiment.

The tilt angle sensor 420 may be any detection type such as an air bubble type, a pendulum type, or a potentiometer type as long as it can detect angles.

The tilt angle sensor 420 may detect the displacement angle with respect to the initial angle or may detect the tilt with respect to the vertical direction.

While the acceleration sensor calculates the angle by accumulating the detected acceleration values, the tilt angle sensor 420 directly detects the angle.

Since the tilt angle sensor directly detects the tilt angle of the antenna device, that is, the posture of the antenna device, the tilt angle sensor may also be referred to as a posture detection sensor in a higher level language.

In FIG. 21, the tilt angle sensor 420 is provided in the housing unit 210.

The tilt angle sensor 420 may be provided in a desired position. The tilt angle sensor may be provided, for example, on a side surface of the housing unit 210.

However, since it is required to measure the tilt of the antenna device in the YZ plane, that is, the angle in the EL direction, the measurement axis needs to be oriented to an appropriate direction.

Figure 22:
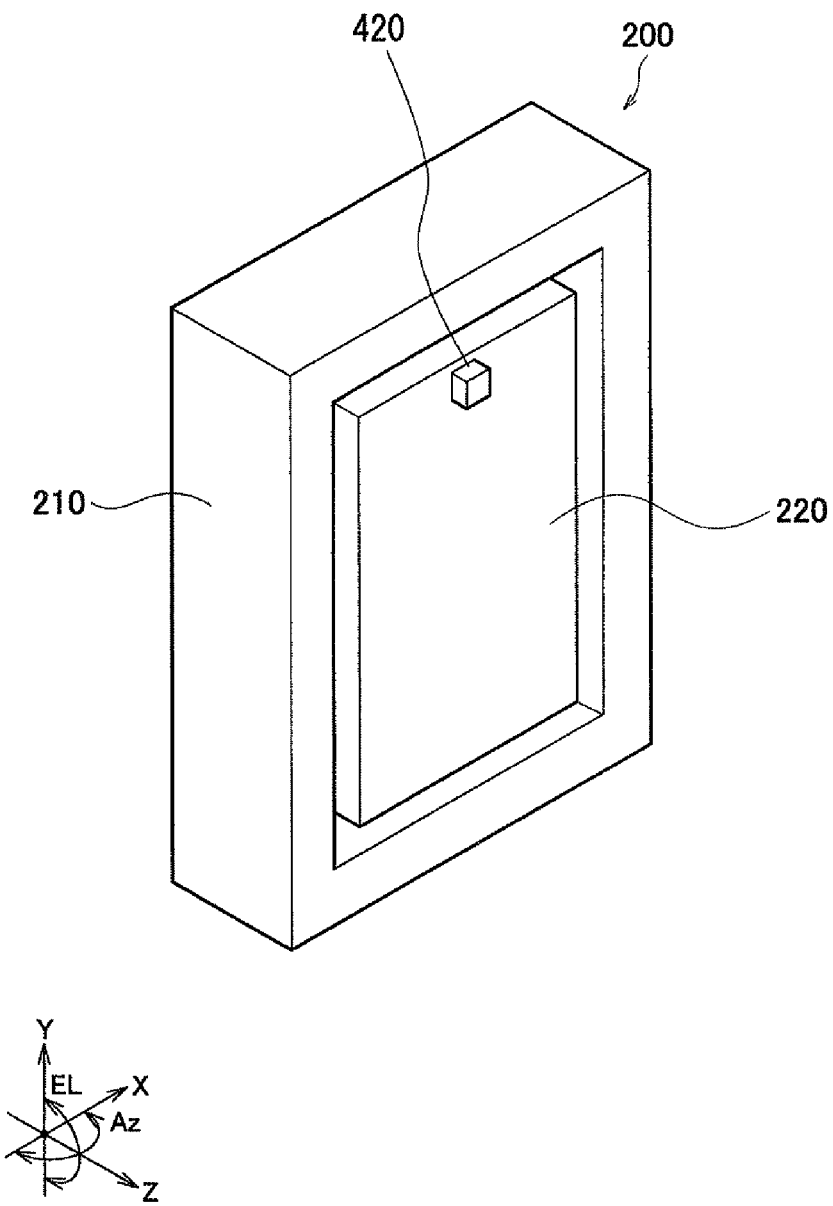
FIG. 22 is a diagram showing a modified example of a position in which a tilt angle sensor is arranged.

As shown in FIG. 22, the tilt angle sensor 420 may be provided in the antenna unit part 220.

Further, the movable coupling means 240 that couples the housing unit 210 and the antenna unit part 220 may not be a ball joint or a universal joint and may be one in which the movable direction is limited to one direction (EL direction).

Figure 23:
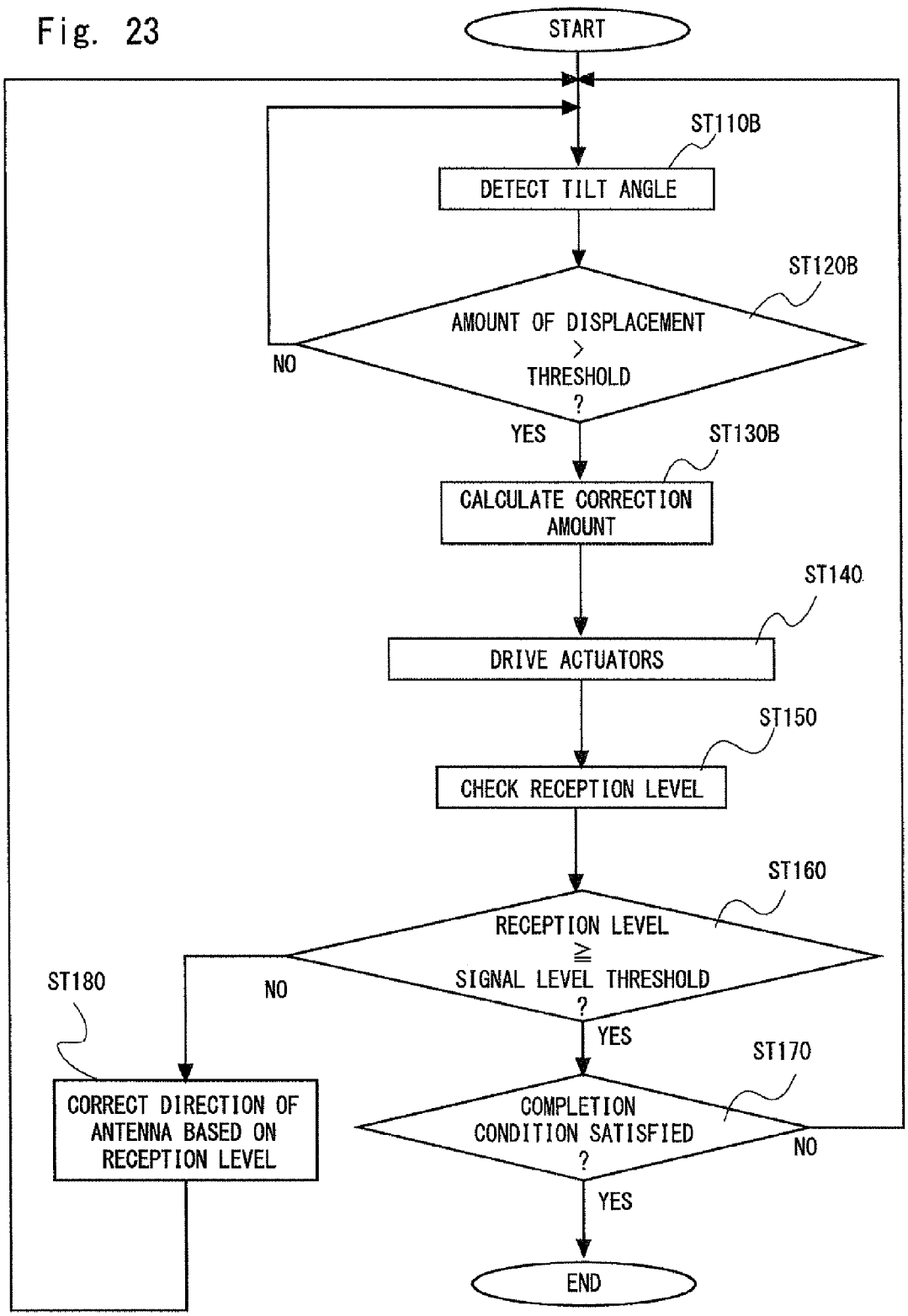
FIG. 23 is a flowchart for describing a control operation in the second exemplary embodiment.

FIG. 23 shows a flowchart of a control operation according to the second exemplary embodiment.

The flowchart shown in FIG. 23 is different from the flowchart shown in FIG. 8 in that the tilt angle is detected in place of the acceleration (ST110B) and it is determined whether the angle displacement exceeds a predetermined threshold (ST120B). The angle displacement here should be interpreted as follows. For example, when the antenna device 200 is installed, the angle of the antenna device 200 is adjusted to an optimal tilt angle. The tilt angle at this time is stored as the optimal tilt angle. The angle is detected by the tile angle sensor 420 from time to time (ST110B), and the difference between the sensor value that is detected and the optimal tilt angle is obtained as the angle displacement.

When the angle displacement exceeds the threshold (ST120B), the correction amount that is required to cancel the angle displacement is calculated (ST130B). The actuator 252A is then driven to correct the direction of the antenna unit part 220.

Since the drive direction of the antenna unit part 220 is limited to the EL direction (elevation angle direction) in the second exemplary embodiment, the number of components can be reduced compared to that in the first exemplary embodiment.

Modified Example 4

Figure 24:
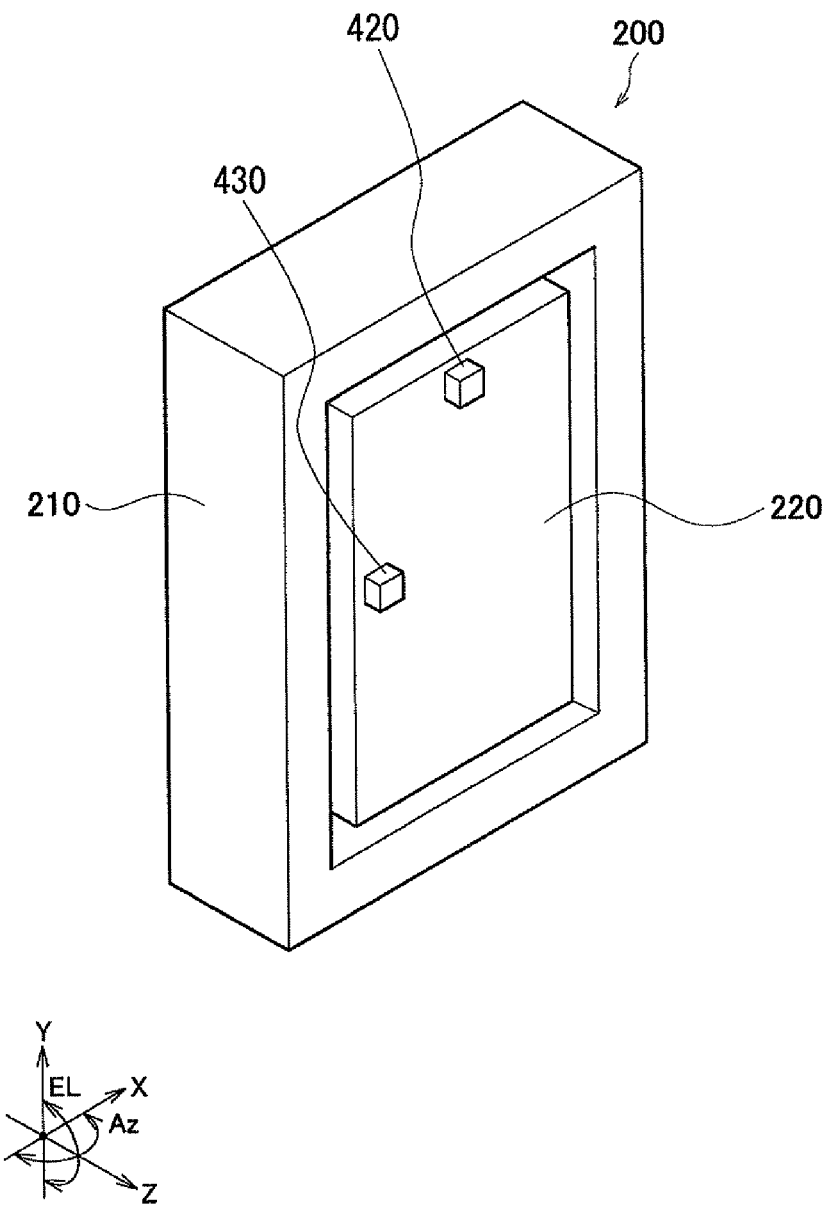
FIG. 24 is a diagram showing a Modified example 4.

As shown in FIG. 24, in addition to the tilt angle sensor 420, a direction sensor 430 may be added as the posture detection sensor. A so-called electronic compass may be used as the direction sensor 430. As a matter of course, the direction sensor 430 detects the displacement of the orientation direction. In this case, the antenna device 200 needs to include a drive mechanism not only for the elevation angle direction (EL direction) but also for the orientation direction (AZ direction).

While the present invention has been described with reference to the exemplary embodiments, the present invention is not limited to the above exemplary embodiments. Various changes that can be understood by those skilled in the art may be made on the configurations and the details of the present invention within the scope of the present invention.

While the plurality of exemplary embodiments and modified examples are shown in the above description, they may be combined in various ways.

This application is based upon and claims the benefit of priority from Japanese Patent Application No. 2013-052071, filed on Mar. 14, 2013 and International Patent Application No. PCT/JP2013/007123, filed on Dec. 4, 2013, the disclosure of which is incorporated herein in its entirety by reference.

REFERENCE SIGNS LIST

120 TRANSMISSION/RECEPTION UNIT
121 RECEPTION CIRCUIT
130 ATTACHMENT MEANS
140 CLAMPING MEANS
141 PRESS METAL FITTING
142 RECEIVING METAL FITTING
143 BOLT
150 ELEVATION ANGLE ADJUSTMENT METAL FITTING
153 ATTACHMENT SCREW
154 ADJUSTMENT SCREW
200 ANTENNA DEVICE

210 HOUSING UNIT
211 OPENING
212 HOUSING SPACE
220 ANTENNA UNIT PART
221 OUTDOOR UNIT
222 PLANAR ANTENNA
223 CABLE
230 VARIATION DETECTION MEANS
231 FIRST ACCELERATION SENSOR
232 SECOND ACCELERATION SENSOR
233 THIRD ACCELERATION SENSOR
234 FOURTH ACCELERATION SENSOR
240 BALL JOINT (MOVABLE COUPLING MEANS)
250 ANGLE ADJUSTMENT MEANS
251 AZIMUTH ANGLE ADJUSTMENT MEANS
251A LINEAR ACTUATOR
251B SPRING
251C LINEAR ACTUATOR
252 ELEVATION ANGLE ADJUSTMENT MEANS
252A LINEAR ACTUATOR
252B SPRING
252C LINEAR ACTUATOR
253 ANGULAR ACCELERATION SENSOR
260 RELATIVE POSITION DETECTION MEANS
261 FIXED-SIDE ELECTRODE
262 MOVABLE-SIDE ELECTRODE
300 CONTROLLER
310 ANGLE CORRECTION PROCESSING UNIT
311 DETECTION UNIT
312 VARIATION AMOUNT CALCULATION UNIT
313 CORRECTION AMOUNT CALCULATION UNIT
320 DRIVE CIRCUIT
330 RECEPTION SIGNAL PROCESSING UNIT
331 RECEPTION INTENSITY DETECTION UNIT
332 PEAK SEARCH UNIT
340 CENTRAL CONTROLLER
410 ANTI-VIBRATION SPRING
420 TILT ANGLE SENSOR
430 DIRECTION SENSOR
900 OPPOSING ANTENNA.

The invention claimed is:

1. An antenna device comprising:
a housing unit that is fixedly installed;
an antenna unit part that is housed in the housing unit and receives radio waves coming from an opposing antenna;
a movable coupling unit that couples the antenna unit part to the housing unit in such a way that the antenna unit part can be relatively oscillated in an azimuth angle direction and an elevation angle direction;
an acceleration detection unit that is arranged in one of the housing unit and the antenna unit part, the acceleration detection unit detects an acceleration that occurs in the azimuth angle direction and the elevation angle direction;
an angle adjustment unit that adjusts a relative angle of the antenna unit part with respect to the housing unit, wherein the angle adjustment unit is one of a plurality of linear actuators arranged between the housing unit and the antenna unit part;
a variation amount calculation unit that calculates a variation amount in the elevation angle direction and the azimuth angle direction based on the acceleration that is detected by the acceleration detection unit;
a correction amount calculation unit that calculates a correction amount to cancel the variation amount calculated by the variation amount calculation unit; and
a drive circuit that drives the angle adjustment unit based on the correction amount.

2. The antenna device according to claim 1, wherein the acceleration detection unit comprises:
first and second acceleration sensors spaced apart from each other in the azimuth angle direction; and
third and fourth acceleration sensors spaced apart from each other in the elevation angle direction.

3. The antenna device according to claim 2, wherein:
the first to fourth acceleration sensors are provided in the housing unit,
the first and second acceleration sensors are spaced apart from each other in the azimuth angle direction and are arranged around an outer periphery of the housing unit, and
the third and fourth acceleration sensors are spaced apart from each other in the elevation angle direction and are arranged around an outer periphery of the housing unit.

4. The antenna device according to claim 2, wherein, when a direction in which the azimuth angle is opened by 180 degrees is denoted by an X direction and a direction in which the elevation angle is opened by 180 degrees is denoted by a Z direction,
the variation amount calculation unit integrates an average value of an x-direction detection value of the first acceleration sensor and an x-direction detection value of the second acceleration sensor twice to calculate a translation amount (dx) along the x direction,
the variation amount calculation unit calculates a rotation angle ($\theta y$) regarding the orientation based on a difference between a z-direction detection value of the first acceleration sensor and a z-direction detection value of the second acceleration sensor, and
when a distance between the antenna device and the opposing antenna is denoted by L, the correction amount calculation unit calculates a correction amount ($\varphi y$) regarding an orientation by the following expression Expression 1

$$\varphi_y = -\theta_y - \arctan\left(\frac{d_x}{L}\right) \times \frac{180°}{\pi}. \quad \text{(Expression 1)}$$

5. The antenna device according to claim 2, wherein,
when a direction in which the azimuth angle is opened by 180 degrees is denoted by an X direction and a direction in which the elevation angle is opened by 180 degrees is denoted by a Z direction, the variation amount calculation unit calculates a rotation angle ($\theta y$) regarding the orientation based on a difference between a z-direction detection value of the first acceleration sensor and a z-direction detection value of the second acceleration sensor, and
the correction amount calculation unit sets a correction amount ($\varphi y$) to $-\theta y$.

6. The antenna device according to claim 1, wherein the acceleration detection unit includes one two-axis angular acceleration sensor that detects an angular acceleration in the azimuth angle direction and an angular acceleration in the elevation angle direction.

7. An antenna device control method, the antenna device comprising:
- a housing unit that is fixedly installed;
- an antenna unit part that is housed in the housing unit and receives radio waves coming from an opposing antenna;
- a movable coupling unit that couples the antenna unit part to the housing unit in such a way that the antenna unit part can be relatively oscillated in an azimuth angle direction and an elevation angle direction;
- an acceleration detection unit that is arranged in one of the housing unit and the antenna unit part, the acceleration detection unit detects an acceleration that occurs in the azimuth angle direction and the elevation angle direction; and
- an angle adjustment unit that adjusts a relative angle of the antenna unit part with respect to the housing unit, wherein the angle adjustment unit is one of a plurality of linear actuators arranged between the housing unit and the antenna unit part, the method comprising:
- calculating a variation amount in the elevation angle direction and the azimuth angle direction based on the acceleration that is detected by the acceleration detection unit;
- calculating a correction amount to cancel the variation amount that is calculated; and
- driving the angle adjustment unit based on the correction amount.

8. A non-transitory computer readable medium storing an antenna device control program, a computer being installed in the antenna device comprising:
- a housing unit that is fixedly installed;
- an antenna unit part that is housed in the housing unit and receives radio waves coming from an opposing antenna;
- a movable coupling unit that couples the antenna unit part to the housing unit in such a way that the antenna unit part can be relatively oscillated in an azimuth angle direction and an elevation angle direction;
- an acceleration detection unit that is arranged in one of the housing unit and the antenna unit part, the acceleration detection unit detects an acceleration that occurs in the azimuth angle direction and the elevation angle direction; and
- an angle adjustment unit that adjusts a relative angle of the antenna unit part with respect to the housing unit, wherein the angle adjustment unit is one of a plurality of linear actuators arranged between the housing unit and the antenna unit part, the non-transitory computer readable medium causes the computer to serve as:
- a variation amount calculation unit that calculates a variation amount in the elevation angle direction and the azimuth angle direction based on the acceleration that is detected by the acceleration detection unit;
- a correction amount calculation unit that calculates a correction amount to cancel the variation amount calculated by the variation amount calculation unit; and
- a drive unit that drives the angle adjustment unit based on the correction amount.

9. An antenna device comprising:
- a housing unit that is fixedly installed;
- an antenna unit part that is housed in the housing unit and receives radio waves coming from an opposing antenna;
- a movable coupling unit that couples the antenna unit part to the housing unit in such a way that the antenna unit part can be relatively oscillated at least in an elevation angle direction with respect to the housing unit;
- a posture detection sensor that is arranged in one of the housing unit and the antenna unit part and detects a tilt angle in the elevation angle direction;
- an angle adjustment unit that adjusts a relative angle of the antenna unit part with respect to the housing unit, wherein the angle adjustment unit is one of a plurality of linear actuators arranged between the housing unit and the antenna unit part;
- a correction amount calculation unit that calculates a correction amount to cancel an angle displacement based on the detection angle detected by the posture detection sensor; and
- a drive circuit that drives the angle adjustment unit based on the correction amount.

* * * * *